(12) United States Patent
Shin et al.

(10) Patent No.: US 12,385,648 B2
(45) Date of Patent: Aug. 12, 2025

(54) APPLIANCE

(71) Applicant: LG ELECTRONICS INC., Seoul (KR)

(72) Inventors: Myeongsu Shin, Seoul (KR); Wanglim Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 240 days.

(21) Appl. No.: 18/229,271

(22) Filed: Aug. 2, 2023

(65) Prior Publication Data
US 2024/0044678 A1 Feb. 8, 2024

(30) Foreign Application Priority Data

Aug. 2, 2022 (KR) .................. 10-2022-0095981

(51) Int. Cl.
| | |
|---|---|
| F24C 15/02 | (2006.01) |
| D06F 34/20 | (2020.01) |
| F24C 7/08 | (2006.01) |
| G01P 15/097 | (2006.01) |
| D06F 39/14 | (2006.01) |
| D06F 103/40 | (2020.01) |
| F25D 29/00 | (2006.01) |

(52) U.S. Cl.
CPC ............ *G01P 15/097* (2013.01); *D06F 34/20* (2020.02); *F24C 7/085* (2013.01); *F24C 15/02* (2013.01); *D06F 39/14* (2013.01); *D06F 2103/40* (2020.02); *F24C 15/022* (2013.01); *F25D 29/005* (2013.01); *F25D 2700/02* (2013.01)

(58) Field of Classification Search
CPC .......... F24C 7/085; F24C 7/082; F24C 15/02; F24C 15/022; D06F 34/20; D06F 39/14; D06F 2103/40; F25D 29/005; F25D 2700/02; G01P 15/097
See application file for complete search history.

(56) References Cited

U.S. PATENT DOCUMENTS

| | | | | |
|---|---|---|---|---|
| 8,327,835 | B2 * | 12/2012 | Larsen | F24C 15/022 49/113 |
| 8,726,791 | B2 | 5/2014 | Adamczak et al. | |
| 2010/0206414 | A1 * | 8/2010 | Adamczak | F24C 15/327 137/800 |

(Continued)

FOREIGN PATENT DOCUMENTS

| | | |
|---|---|---|
| CN | 212109183 | 12/2020 |
| EP | 3462677 A1 * | 4/2019 |

(Continued)

OTHER PUBLICATIONS

Extended European Search Report dated Dec. 19, 2023 issued in Application No. 23189132.6.

*Primary Examiner* — Kimberley S Wright
(74) *Attorney, Agent, or Firm* — KED & ASSOCIATES, LLP

(57) ABSTRACT

Disclosed herein is an appliance. The appliance includes a detection main body portion configured to receive a force generated due to movement of a door as an input, a first sensor configured to detect opening and closing of the door, and a second sensor configured to detect a vibration input to the door, wherein both the first sensor and the second sensor detect the force input to the detection main body portion.

20 Claims, 15 Drawing Sheets

(56) References Cited

U.S. PATENT DOCUMENTS

| | | | |
|---|---|---|---|
| 2012/0138108 A1* | 6/2012 | Astiz Montoya | A47L 15/4259 292/137 |
| 2014/0268648 A1* | 9/2014 | Gomes | D06F 39/14 312/405 |
| 2015/0068510 A1* | 3/2015 | Lee | F24C 15/006 126/193 |
| 2016/0320067 A1* | 11/2016 | Dachs | F25D 29/005 |
| 2023/0015953 A1* | 1/2023 | Kim | F21V 33/0044 |
| 2023/0111114 A1* | 4/2023 | Kim | F24C 15/008 709/220 |
| 2023/0407689 A1* | 12/2023 | DeYoung | E05C 19/024 |

FOREIGN PATENT DOCUMENTS

| | | | | |
|---|---|---|---|---|
| JP | 2018-094416 | | 6/2018 | |
| KR | 20120091036 A | * | 8/2012 | |
| KR | 10-2015-0030016 | | 3/2015 | |
| WO | WO-2010139536 A1 | * | 12/2010 | ............. A21B 3/02 |
| WO | WO 2015/086247 | | 6/2015 | |
| WO | WO-2019197596 A1 | * | 10/2019 | ............. E05F 15/40 |
| WO | WO 2021/125428 | | 6/2021 | |

\* cited by examiner

APPLIANCE

CROSS-REFERENCE TO RELATED APPLICATION(S)

This application claims priority to and the benefit of Korean Patent Application No. 10-2022-0095981, filed in Korea on Aug. 2, 2022, the disclosure of which is incorporated herein by reference in its entirety.

BACKGROUND

1. Field

The present disclosure relates to an appliance, and more particularly, to an appliance having a see-through window provided in a door to allow an inside of the appliance to be viewed from the outside.

2. Background

Appliances, such as refrigerators, ovens, dish washer, laundry machines, clothes dryers, or clothes treatment apparatus, may include an inner space to accommodate an object and a door to access the inner space. The inner space for accommodating an object may be defined inside a cabinet forming an exterior of an appliance, and the door may open and close an opening to access the inner space. Two or more doors may be included in such appliances, as necessary.

Generally, a door of an appliance may be manufactured to be opaque. Therefore, it may be difficult to check a status of an object accommodated inside an accommodation space while the accommodation space is closed by the door. In an appliance including such an opaque door, a user opens the door for checking an object accommodated inside an accommodation space. However, in a case of an appliance in which an environment in the inner space is heated, cooled, etc., such as a refrigerator, a freezer, an oven, or a dryer, cold air or hot air inside the appliance may escape outside of the appliance when the door is opened, which may cause undesired environmental changes in the accommodation space and undesirable energy loss as the temperature in the accommodation space is restored after the door is closed.

Also, in a case of an appliance in which water or other material is introduced inside the accommodation space, such as a washing machine or dishwasher, wash water may pour out when the door is opened. Accordingly, a door of an appliance may be locked to prevent opening of the door during certain operations. For example, the door of a front-loading washing machine currently performing a washing operation may be maintained in a locked state to prevent the door from being opened during the washing operation to prevent water from escaping.

In some cases, a see-through window may be mounted on a door of some appliances, such as an oven, a washing machine, or a dryer. Because a see-through window is mounted on a door in this way, a state of an object inside the appliance can be observed through the see-through window. However, even when a see-through window is mounted on a door of an appliance, as described above, it may be difficult to properly check an object therein at night or when it is dark around the appliance and within the storage space.

Accordingly, in recent years, appliances having a see-through window may further include a lighting device for illuminating the inside space where an object is accommodated. Such appliances may include an operation switch for turning the lighting device on or off, and a user may operate the operation switch and turn on the lighting device to more clearly observe a state of an object through the see-through window.

However, when the operation switch for turning the lighting device on or off is separately provided in the appliance, the number of operation switches included in the appliance may increase correspondingly. In this case, the overall aesthetic sense of the appliance may be degraded due to an excessive number of operation switches being disposed in the appliance. Also, when an excessive number of operation switches are disposed in an appliance, the size of each operation switch is inevitably decreased, or the operation switches are inevitably disposed at close intervals. This may increase the possibility of an occurrence of erroneous operation of the operation switches and may reduce a convenience of operation by a user. Also, an excessive number of operation switches may make it difficult for a user to remember which operation switch to operate in each situation, and this excessive number of operation switches may make it difficult for the user to properly use the appliance. Furthermore, when it is dark around the appliance, it may be difficult for a user to locate and operate the operation switch for turning the lighting device on or off, such that the lighting device, which is useful when it is dark around the appliance, becomes difficult to use due to the darkness around the appliance.

In recent years, certain appliances have been configured to operate a lighting device to illuminate the inside of or adjacent to the appliance in response to a user input of knocking on the door or other part of the appliances. Such an appliance allows the lighting device to be operated and to illuminate an inside of the appliance in response to a user knocking on a surface of the appliance and without opening the door or manipulating an operation switch. Thus, the above-described problems related to operating the operation switch can be addressed to some extent.

In a home appliance that allows a user to operate a lighting device to illuminate the inside of the appliance in response to a user knocking (hereinafter referred to as "knock-on function"), a lamp or other lighting device may be operated when an acoustic wave generated due to a knock input is detected by a sensor. However, in an appliance having the knock-on function, possible locations for installing the sensor may be limited.

For example, possible installation positions for the sensor may be limited by functional attributes of the appliance. In a case of an appliance that is heated, such as an oven having a heated cooking chamber opened and closed by a door, high-temperature heat may be transferred to the door and regions of the appliance around the door, and the sensor may be preferably installed away from the heated door and other portions of the appliance around the door to prevent the sensor from malfunctioning or being damaged due to the heat. Similarly, in a washing machine or other appliance having water, the sensor may be positioned to avoid contact with water and cleaning compounds that may damage the sensor.

Furthermore, the appliance having the knock-on function may have a limited number of positions for installing the sensor to accurately detect the knock. For example, an appliance having the knock-on function typically positioned the sensor so that a first location contacted by the user when performing the knock and a second location where the sensor is installed are separated by a single medium (e.g., a metal plate). As described below, the use of a single medium for transmitting an acoustic wave generated by the knock to the sensor may be desirable because use of a single medium allows the acoustic wave to be carried through a continuous and identifiable medium. However, the appliance may have a very limited number of positions for installing the sensor that are connected by a single medium to an external appliance surface receiving the knock.

For example, an acoustic wave sensor for recognizing a knock input may be installed on a front panel of the appliance. Installation of the acoustic wave sensor or other sensor at a front panel of the appliance or other location to connect a knock location to the sensor by a single medium may be desirable because, in addition to a vibration caused by a knock, various other vibrations generated in the appliance itself or caused by an external force may be present in an appliance. If the other vibrations and the vibration caused by the knock are not distinguished, an erroneous detection of the knock may occur such that a light may be operated even when a knock is not inputted by a user. In order to distinguish between a vibration of the knock and other vibrations, an appliance having the knock-on function may adopt a method based on a using a single medium between the position at which the knock is made and the position at which an acoustic wave sensor is installed. When heterogenous media are present between a source of a vibration and the sensing position, an attenuation range of acoustic waves transmitted along the heterogeneous media may be very large relative to an attenuation range of transmissions within a single medium. Therefore, an appliance may detect an attenuation of the intensity of acoustic waves and may use the attenuation to distinguish between acoustic waves due to a knock made on the front panel and other acoustic waves, such as acoustic waves due to the vibration of the appliance itself or the vibration caused by another external force.

Thus, an appliance may apply the above-described vibration distinguishing method with the acoustic wave sensor on the front panel to detect a knock input at a front panel and to recognize that a vibration not generated at the front panel is not a knock, and thus operational errors due to mistakes in detecting a vibration of a refrigerator itself or a vibration caused by another external force can be effectively reduced. However, possible installation positions for the acoustic wave sensor on the front panel or other locations separated by a single sound transmission medium are limited. Also, use of the acoustic wave sensor to distinguish a knock signal generated at the front panel from vibrations caused by other reasons may cause other problems.

For example, the acoustic wave sensor may recognize whether a knock has been input in consideration of the intensity and pattern of acoustic waves, but the acoustic wave sensor may mistakenly recognize other acoustic waves associated with other factors as a knock when the other acoustic waves have similar intensity and pattern as a knock. Furthermore, since the detection of acoustic waves is performed without considering a direction relative to the position at which acoustic waves are generated, the acoustic wave sensor is not able to determine the position at which acoustic waves have been generated. Therefore, the acoustic wave sensor may not properly distinguish between first acoustic waves that are generated due to a knock made on the door from second acoustic waves generated due to other reasons at another position away from the door but having similar intensities and patterns. Thus, when the intensity and pattern of second acoustic waves generated due to other reasons away from the door are similar to those of first acoustic waves generated due to a knock to the door, the acoustic wave sensor may mistakenly detect the second acoustic waves as a knock.

As previously described, in the case of an appliance in which a high-temperature state is maintained at a door and around the door, such as an oven, a sensor may be installed away from the see-through window to reduce a risk that the sensor may malfunction or be damaged due to hot air transferred to the see-through window. However, when the sensor is installed at a position away from the see-through window, a distance between a knock input point and the sensor is increased correspondingly, and a resulting degradation of knock detection performance may occur.

Also, an acoustic wave sensor may be installed in a state of being pressed toward the door, and a sensitivity of an acoustic wave sensor may vary according to an extent to which the acoustic wave sensor is pressed toward the door. For example, when the acoustic wave sensor is strongly pressed toward the door, the sensitivity of the acoustic wave sensor may be lowered, and when the acoustic wave sensor is weakly pressed toward the door, the sensitivity of the acoustic wave sensor may be higher. When the sensitivity of the acoustic wave sensor is relatively low, the knock detection performance may be correspondingly low, and when the sensitivity of the acoustic wave sensor is too high, the acoustic wave sensor may incorrectly react to even low-intensity acoustic waves around the door, such as a vibration sound of a motor, causing an increase in the possibility of an occurrence of erroneous detection.

As described above, due to a difficulty of filtering vibration due to noise, an acoustic wave sensor may be conventionally adopted in place of a vibration sensor for knock detection of an appliance. Also, conventionally, it is difficult to position the acoustic wave sensor on the door due to high-temperature heat in appliances such as an oven, and the acoustic wave sensor is inevitably installed at a position away from the door and the see-through window. However, when a distance between a knock input point and the acoustic wave sensor is increased, it becomes difficult to accurately detect a knock input due to an increased attenuation of transmitted acoustic waves, and it becomes difficult to filter a noise signal.

Meanwhile, newly released appliances have increasing numbers of cutting-edge functions for convenience in use, and accordingly, operation devices for operating the numerous additional functions are being added to doors. Accordingly, the design and manufacture of doors are gradually becoming more complicated, and devices or elements for newly-added functions are often positioned at locations other than a door. In particular, because the sizes of a see-through window and a display that are mounted on a door continue to increase, it is becoming difficult to arrange a free space for additionally placing devices, such as sensors, elements, and modules for various functions, on the door. Accordingly, a need to attach the corresponding devices at positions other than the door is rising, and this need is also is true for a sensor for detecting a knock input.

Meanwhile, certain appliances that are built into a living room or a kitchen, such as ovens that are built into a kitchen, may omit a cabinet for forming an exterior of the appliance. Such built-in type ovens are generally installed, for example, by being fitted between a piece of kitchen furniture and a wall surface or between a piece of kitchen furniture and another piece of kitchen furniture. Therefore, it may be difficult to secure a space for installing a sensor assembly even between a side surface of the appliance such as an oven, and a piece of kitchen furniture or a wall surface. Considering that there are not many places where the sensor assembly can be installed other than the side surface or door of the appliance, it is difficult to position the sensor assembly on the appliance. For example, it may be difficult to position the sensor assembly to meet various strict conditions to improve knock detection performance while also securing an installation space for the sensor assembly on the appliance.

BRIEF DESCRIPTION OF THE DRAWINGS

The embodiments will be described in detail with reference to the following drawings in which like reference numerals refer to like elements wherein.

DETAILED DESCRIPTION

Figure 1:
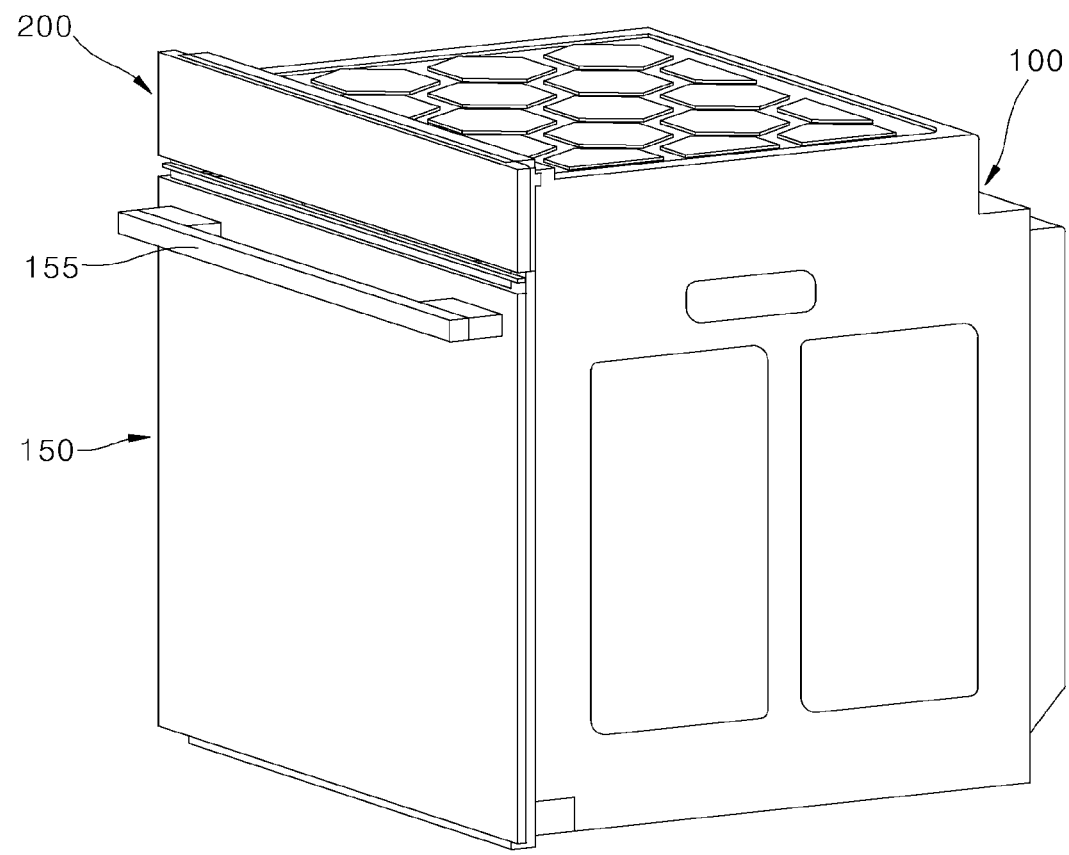
FIG. 1 is a perspective view illustrating an appliance according to one example of the present disclosure.

The objectives, features, and advantages will be described in detail below with reference to the accompanying drawings, and accordingly, those of ordinary skill in the art to which the present disclosure pertains should be able to easily practice the technical idea of the present disclosure. In describing the present disclosure, when it is determined that detailed description of a known art related to the present disclosure may unnecessarily obscure the gist of the present disclosure, the detailed description thereof will be omitted. Hereinafter, exemplary examples according to the present disclosure will be described in detail with reference to the accompanying drawings. In the drawings, the same reference numerals are used to indicate the same or similar components.

Although terms such as first and second are used to describe various components, of course, the components are not limited by the terms. The terms are only used to distinguish one component from another component, and of course, a first component may also be a second component unless otherwise stated.

The present disclosure is not limited to the examples disclosed below and may be changed in various ways and implemented in various different forms. The present examples make the disclosure of the present disclosure complete and are provided to completely inform those of ordinary skill in the art of the scope of the disclosure. Therefore, the present disclosure should be understood as, instead of being limited to the examples disclosed below, including all changes, equivalents, or substitutes included in the technical idea and scope of the present disclosure as well as any substitution or addition made between a configuration of any one example and a configuration of another example.

The accompanying drawings are only provided to facilitate understanding of the examples disclosed herein, and the technical idea disclosed herein is not limited by the accompanying drawings and should be understood as including all changes, equivalents, or substitutes included in the idea and technical scope of the present disclosure. In the drawings, sizes or thicknesses of components may be exaggerated or reduced in consideration of convenience of understanding, etc., but the protection scope of the present disclosure should not be construed as being limited thereby.

The terms used herein are only used to describe specific implementation examples or examples and are not intended to limit the present disclosure. Also, a singular expression includes a plural expression unless the context clearly indicates otherwise. In this specification, terms such as "include" or "consist of" are intended to designate that features, numbers, steps, operations, components, parts, or combinations thereof described herein are present. That is, in this specification, the terms such as "include" or "consist of" should not be understood as precluding the possibility of presence or addition of one or more other features, numbers, steps, operations, components, parts, or combinations thereof. Terms including ordinals such as "first" and "second" may be used to describe various components, but the components are not limited by the terms. The terms are only used for the purpose of distinguishing one component from another component.

When a certain component is mentioned as being "connected" or "linked" to another component, although the certain component may be directly connected or linked to the other component, it should be understood that another component may be present therebetween. On the other hand, when a certain component is mentioned as being "directly connected" or "directly linked" to another component, it should be understood that other components are not present therebetween. When a certain component is mentioned as being "on" or "under" another component, it should be understood that the certain component may be disposed directly on the other component or another component may be present therebetween.

Unless otherwise defined, all terms including technical or scientific terms used herein have the same meaning as commonly understood by one of ordinary skill in the art to which the present disclosure pertains. Terms, such as those defined in commonly used dictionaries, should be construed as having a meaning that is consistent with their meaning in the context of the relevant art and are not to be construed in an idealized or overly formal sense unless expressly so defined herein.

A direction in which a door is installed based on the center of an appliance in a state in which the appliance is placed on a floor is defined as forward. Therefore, a direction approaching the inside of the appliance in a state in which the door is open is rearward. For convenience, a forward-rearward direction may be referred to as a first direction. Then, forward may be referred to as one direction of the first direction, and rearward may be referred to as the other direction of the first direction. Also, the direction of gravity may be defined as downward, and the direction opposite to the direction of gravity may be defined as upward.

Also, a horizontal direction orthogonal to the front-rear direction of the appliance, that is, a width direction of the appliance when the appliance is viewed from in front of the door of the appliance, may be referred to as a left-right direction. For convenience, the left-right direction may be referred to as a second direction. Then, rightward may be referred to as one direction of the second direction, and leftward may be referred to as the other direction of the second direction.

Also, the width direction of the appliance may also be referred to as a lateral direction. Then, rightward may be referred to as one direction of the lateral direction, and leftward may be referred to as the other direction of the lateral direction. Also, the above-described up-down direction may be referred to as a third direction. Then, upward may be referred to as one direction of the third direction, and downward may be referred to as the other direction of the third direction. Also, the above-described up-down direction may be referred to as a vertical direction. Then, both the front-rear direction and the left-right direction, that is, the first direction and the second direction, may be referred to as a horizontal direction.

Throughout the specification, "A and/or B" may refer to A, B, or A and B unless particularly described otherwise, and "C to D" may refer to C or more and D or less unless particularly described otherwise.

Figure 2:
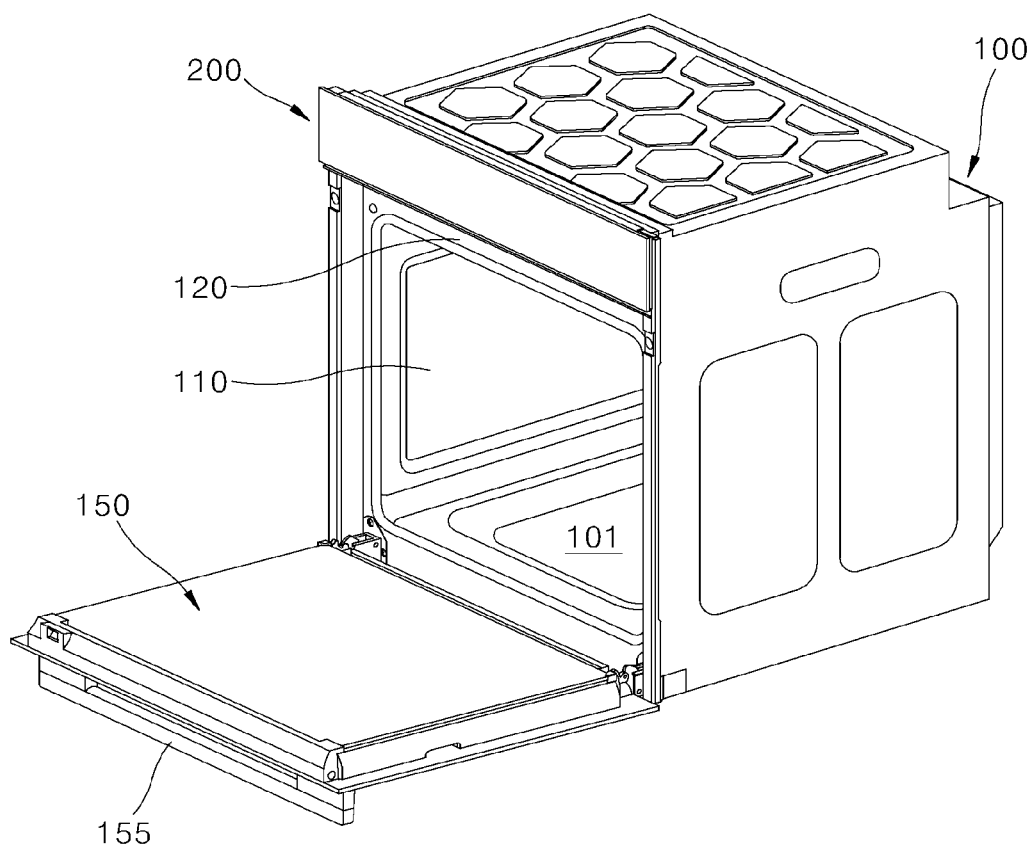
FIG. 2 is a perspective view showing an open state of a cooking chamber of the appliance illustrated in FIG. 1.
Figure 3:
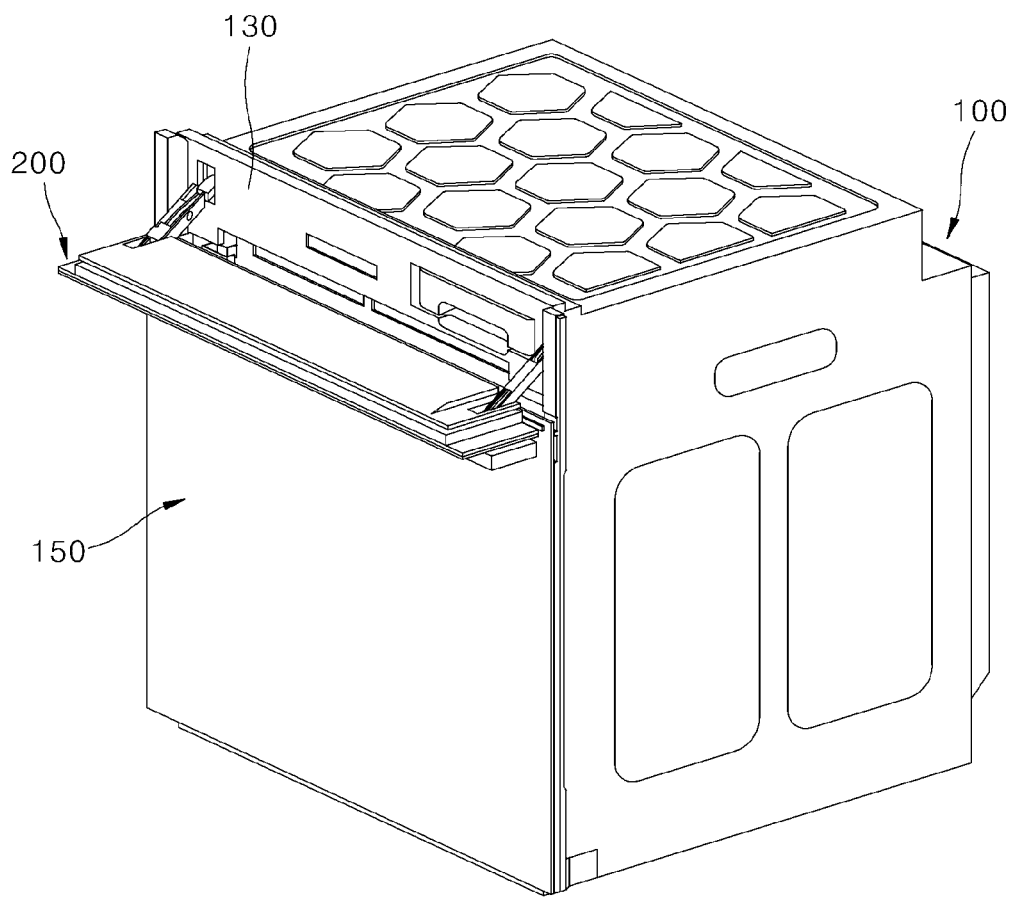
FIG. 3 is a perspective view showing an open state of a control panel of the appliance illustrated in FIG. 1.
Figure 4:
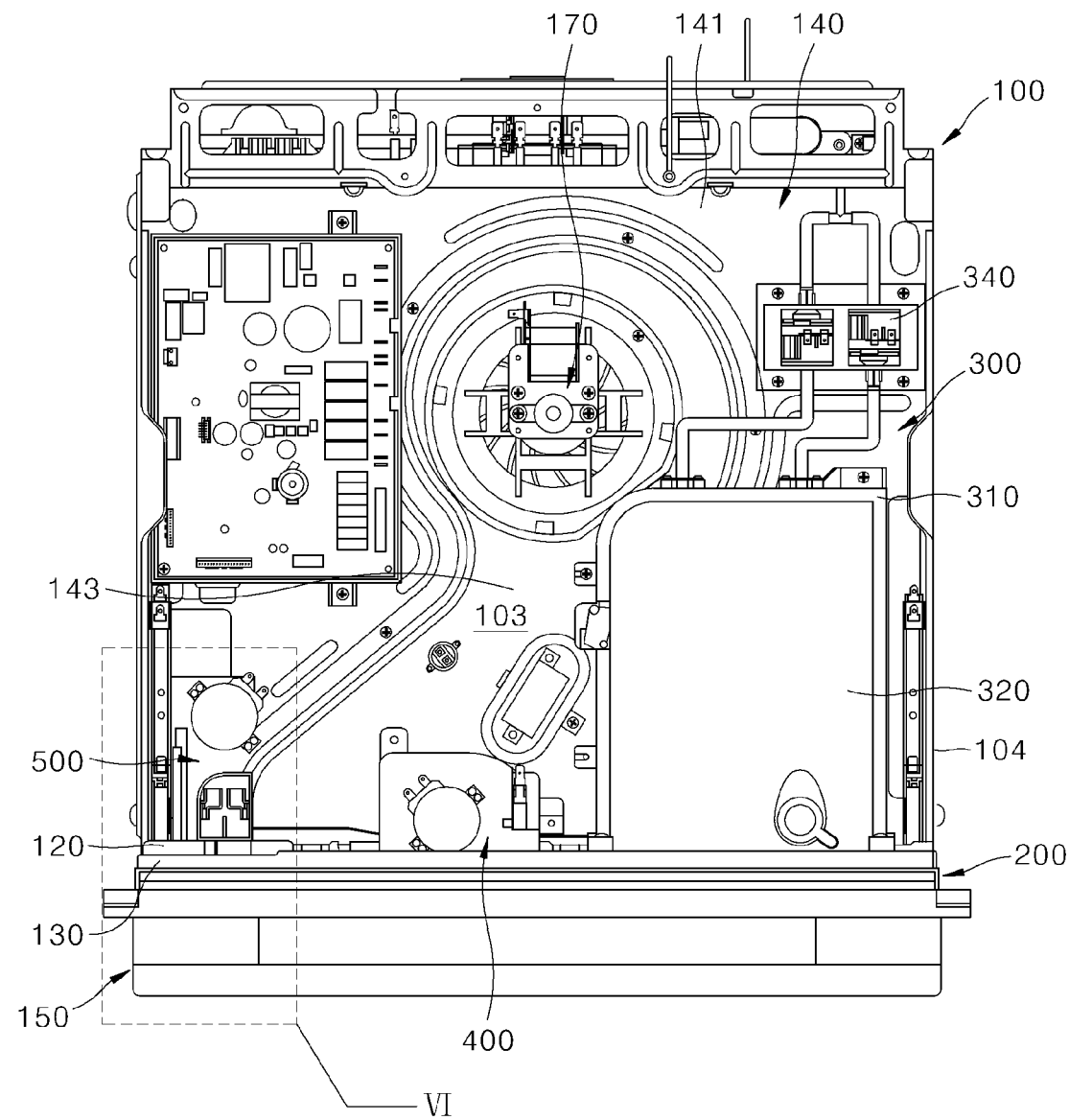
FIG. 4 is a plan view showing an internal structure of a second accommodation space of the appliance illustrated in FIG. 1.
Figure 5:
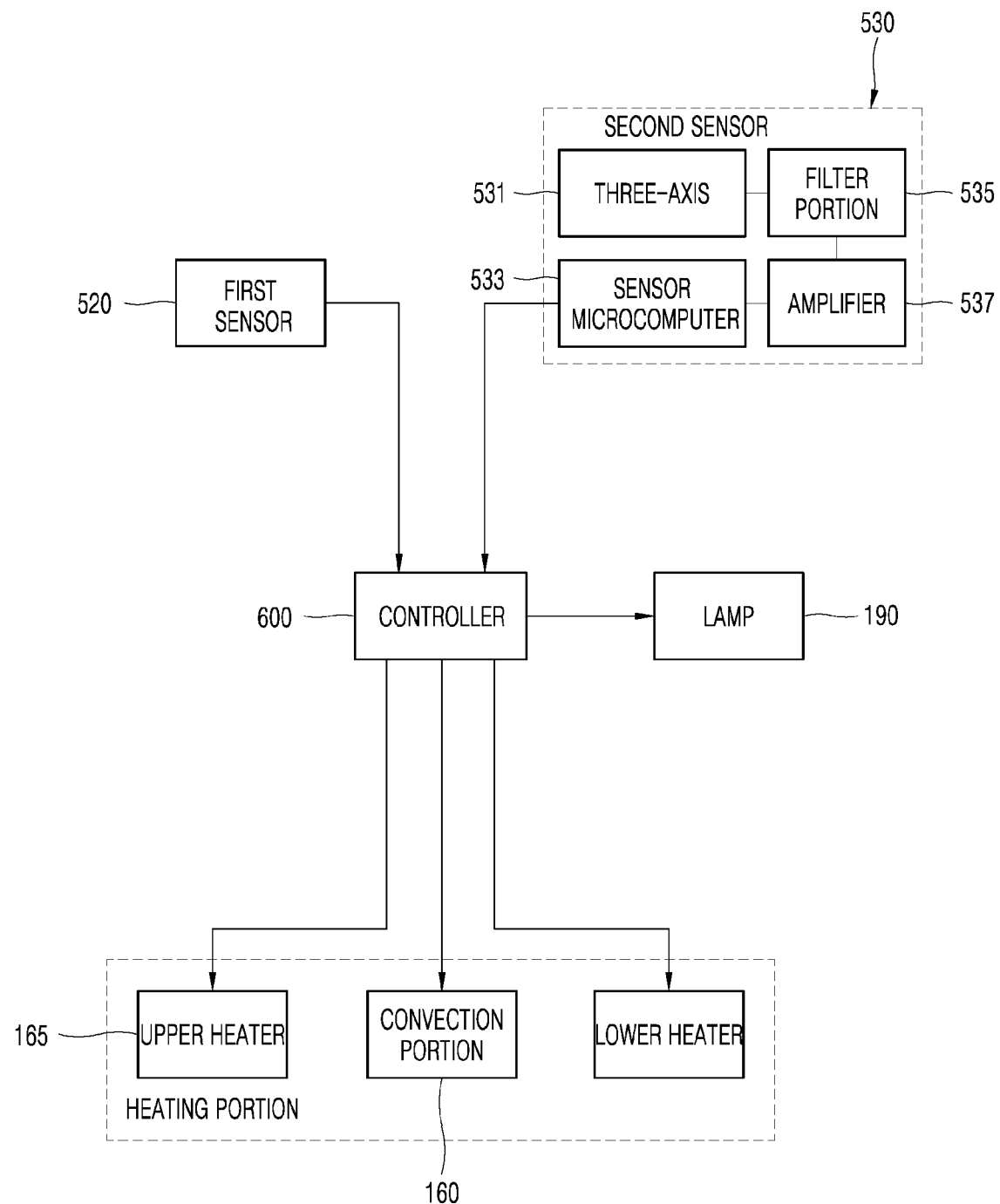
FIG. 5 is a block diagram schematically showing a configuration of the appliance according to one example of the present disclosure.

FIG. 1 is a perspective view illustrating an appliance according to one example of the present disclosure, FIG. 2 is a perspective view showing an open state of a cooking chamber of the appliance illustrated in FIG. 1, and FIG. 3 is a perspective view showing an open state of a control panel of the appliance illustrated in FIG. 1. Also, FIG. 4 is a plan view showing an internal structure of a second accommodation space of the appliance illustrated in FIG. 1, and FIG. 5 is a block diagram schematically showing a configuration of the appliance according to one example of the present disclosure. In the following discussion, an example of an oven for heating food objects is described, but it should be appreciated that the principles discussed with respect to the oven having a knock sensor may also be applied to other types of appliances.

Referring to FIGS. 1 to 3, an exterior of the appliance according to one example of the present disclosure may be formed by a main body 100. The main body 100 may be provided in a form that includes a substantially rectangular parallelepiped shape. The main body 100 may be formed of a material having a predetermined strength, such as metal, in order to protect a plurality of components installed in an inner space thereof. The main body 100 may include a cavity (or cavity walls) 110, and the cavity 110 may form a frame of the main body 100.

Also, the main body 100 may further include front panels 120 and 130. The first front panel 120 may be disposed between the cavity 110 and a door 150. For example, the first front panel 120 may provide a contact surface between the main body and the door 150 when the door 150 is in a closed state. The first front panel 120 may be disposed at a front side of the cavity 110 and form a portion of a front surface of the main body 100. As another example, the first front panel 120 may not be separately provided from the cavity 110, and a front surface of the cavity 110 may form the front surface of the main body 100. For example, the first front panel 120 may form a portion of the cavity 110, and both the cavity 110 and the first front panel 120 may be provided in the main body 100.

A first accommodation space 101 may be formed inside the cavity 110. Also, an opening 126 configured to open the first accommodation space 101 forward may be formed inside the first front panel 120. The first accommodation space 101 may be formed in a substantially hexahedral shape with an open front surface. In a state in which the first accommodation space 101 is closed, the appliance may heat an inner space of the first accommodation space 101 to cook food. As used herein, the direction "front" may refer to a side of the appliance including the door 150 and/or the opening to the accommodation space 101. For example, in the appliance, the inner space of the first accommodation space 101 may be a cooking chamber defining a space where food is cooked. Hereinafter, the case in which the appliance is a cooking appliance will be described as an example of the present disclosure.

A heating portion configured to heat the first accommodation space 101 may be provided in the appliance. As an example of the heating portion, as illustrated in FIG. 5, a convection portion (or convection module) 160 configured to cause convection of hot air to heat the inner space of the first accommodation space 101 may be provided as the heating portion at a rear side of the first accommodation space 101. For example, the convection portion 160 may include fan to generate an air flow within the first accommodation space 101.

Also, an upper heater 165 or an upper burner configured to heat the inner space of the first accommodation space 101 from an upper side may be provided as a heating mechanism at an upper side of the first accommodation space 101. Also, a lower heater or a lower burner configured to heat the inner space of the first accommodation space 101 from a lower side may also be provided as a heating mechanism at a lower side of the first accommodation space 101.

As illustrated in FIGS. 1 and 2, the door 150 configured to selectively open or close the first accommodation space 101 may be rotatably provided at a front side of the main body 100. The door 150 may open or close the first accommodation space 101 by being operated in a pull-down manner in which an upper end of the door 150 vertically rotates about a lower end thereof. The door 150 may be formed in a hexahedral shape having a predetermined thickness as a whole. Also, a handle 155 provided to be gripped by a user when the user wants to rotate the door 150 may be installed at a front surface of the door 150.

Also, a see-through window may be provided at the door 150. The see-through window may be implemented using a transparent material, such as glass or transparent plastic. According to a type of appliance in which the see-through window is applied, the see-through window may be designed to withstand high temperature and/or high pressure. Additionally or alternatively, additional treatments, such as waterproofing and heat-proofing may be added to the see-through window.

As illustrated in FIG. 4, a second accommodation space 103 may be provided at a portion of the appliance outside the cavity 110, such at an upper side of the cavity 110. For example, the second accommodation space 103 may be disposed at an upper side of the cavity 110 and the first accommodation space 101 formed therein. In other examples, the second accommodation space 103 may be formed at a side of the cavity 110 forming a bottom or side surface of and the first accommodation space 101.

A space for installing electric components may be formed inside the second accommodation space 103. For example, in the appliance, the second accommodation space 103 may be an electric component chamber which is a space for installing electric components.

A front surface of the second accommodation space 103 may be covered by at least one of the front panels 120 and 130. A second front panel 130 may be provided above the first front panel 120. The second front panel 130 may cover a front side of the second accommodation space 103 and may be disposed between the second accommodation space 103 and a control panel 200, which may be provided at a front surface of the appliance above the door 150. As an example, the second front panel 130 may be disposed at an upper side of the first front panel 120 and may be coupled to the first front panel 120.

The second front panel 130 may protrude to a portion above the cavity 110 and define a front boundary surface of the second accommodation space 103. In one example, most of the front side of the second accommodation space 103 may be covered by the second front panel 130 in a front-rear direction. Also, a portion of the front side of the second accommodation space 103, that is, a portion of a lower side of the second accommodation space 103, may be covered by the first front panel 120 in the front-rear direction.

Meanwhile, an exhaust port 122 may be provided in at least one of the front panels 120 and 130. In one example, the exhaust port 122 may be provided in the first front panel 120. The exhaust port 122 may be formed to pass through the first front panel 120 in the front-rear direction. The exhaust port 122 may form a passage in the front panels 120 and 130 to allow air inside the second accommodation space 103 to pass through the first front panel 120 and be discharged to the outside of the second accommodation space 103.

The exhaust port 122 may be disposed at a position biased toward one side end of the first front panel 120 in the left-right direction from the center of the first front panel 120 in the left-right direction. For example, the exhaust port 122 may be disposed between the center of the first front panel 120 in the left-right direction and a right side of the first front panel 120. As another example, the front panels 120 and 130 may not be separately provided from the cavity 110, and the front surface of the cavity 110 may form the front surface of the main body 100. In this case, the exhaust port 122 may be provided in the front surface of the cavity 110 that is formed in a shape corresponding to the shapes of the front panels 120 and 130.

The control panel 200 may be provided at an upper portion of the front surface of the appliance, such as at a front surface of the portion above the cavity 110. The control panel 200 may form a portion of the front exterior of the appliance. The control panel 200 may be disposed at the front side of the second accommodation space 103. Also, the control panel 200 may be disposed at a front side of the second front panel 130.

As illustrated in FIGS. 3 and 4, the control panel 200 may be provided to open and close the second accommodation space 103 or the second front panel 130. The control panel 200 is provided to rotate between a closing position at which the control panel 200 blocks the second accommodation space 103 or the second front panel 130 and an opening position at which the control panel 200 opens the second accommodation space 103 or the second front panel 130 forward.

A display may be provided on the control panel 200. The display may include an input portion (or input device) allowing an operation of the appliance to be controlled and a display configured to display an operational state of the appliance. As an example, the input portion and the display may be configured by a single panel. For example, the input portion and the display may be formed as a touch panel that receives a touch input of a user. The display may display a user interface (UI) or a graphic user interface (GUI) relating to the operation of the appliance.

A plurality of buttons may be displayed on the control panel 200 having the display. For example, a knock-on button for setting a function that allows a lamp 190 installed in the first accommodation space 101 to be turned on or off by a knock input of a user may be displayed on the control panel 200. Also, a lamp button for setting a function for manually turning the lamp on or off, a button for setting the operation of opening or closing the control panel 200, and the like may be displayed on the control panel 200. Also, when the appliance is an oven, a button for setting an operation of the heating portion, a self-cleaning button for setting a self-cleaning function of the first accommodation space 101, and the like may be displayed on the control panel 200.

As another example, the control panel 200 may be provided in the form of a simple panel that does not include the input portion, the display, or the like. For example, the panel 200 may be a metal or plastic plate to cover second front panel 130. The control panel 200 in this form may be disposed at the front side of the second accommodation space 103 to cover the second accommodation space 103, may rotate downward to move to the opening position, and may be unfolded forward at the opening position, like the control panel 200 described above.

As still another example, the control panel 200 may be provided so that only a portion of the control panel can be opened. For example, a structure in which the control panel 200 is divided into a plurality of areas in the lateral direction may be applied. In this case, among the plurality of areas of the control panel, only an area that covers a water tank 320 or other component within the second accommodation space 103 from a front side may rotate downward and be unfolded forward, and the remaining areas may be fixed and not be opened. In yet another example, a structure in which the control panel 200 is divided into a plurality of areas in the up-down direction, and among the plurality of areas, only an upper area that covers the water tank 320 or other component in the second accommodation space 103 from the front side rotates downward and is unfolded forward may be applied.

[Structure Inside Second Accommodation Space]

FIG. 4 is a plan view showing an internal structure of the second accommodation space of the appliance illustrated in FIG. 1. A lower boundary surface of the second accommodation space 103 may be defined by an upper panel 140 disposed at an upper side of the cavity 110. Also, an upper boundary surface of the second accommodation space 103 may be defined by an electric component chamber cover 145 configured to cover the second accommodation space 103 from above.

Also, side boundary surfaces and a rear boundary surface of the second accommodation space 103 may be defined by both side surfaces and a back surface of the electric component chamber cover 145 or may be defined by both side surfaces of the cavity 110 that protrude to an upper side of the first accommodation space 101 and a back surface of the electric component chamber cover 145.

An air hole 104 may be formed in at least one of any side surfaces or a back surface of the electric component chamber cover 145 or at side surfaces of the cavity 110. Through the air hole 104, outside air may be introduced into the second accommodation space 103.

Various electric components may be disposed inside the second accommodation space 103, as described above. As an example thereof, a circuit board may be disposed inside the second accommodation space 103. Various devices, circuits, and the like relating to reception of operation signals input through the control panel 200, generation of control signals for controlling the operation of the heating portion, and the like may be provided on the circuit board.

The upper panel 140 may include a blocking plate portion (or blocking plate region) 141 and a duct portion (or duct region) 143. The blocking plate portion 141 may be disposed to block between the cavity 110 and the second accommodation space 103. The blocking plate portion 141 may be disposed at an upper side of the cavity 110 to define the lower boundary surface of the second accommodation space 103.

The duct portion 143 may be formed to protrude upward from the blocking plate portion 141. The duct portion 143 may form a passage that allows air inside the second accommodation space 103 to be discharged to the outside of the second accommodation space 103 through the inside of the duct portion 143. For example, the duct portion 143 may form a passage that allows air suctioned by a fan module 170, which will be described below, to flow, for example, toward the exhaust port 122.

The fan module 170 may be disposed inside the second accommodation space 103. The fan module 170 may be disposed at a position biased toward a side adjacent to a rear surface of the cavity 110, such as a rear side inside the second accommodation space 103. The fan module 170 may be formed to include a turbofan installed inside the second accommodation space 103. The fan module 170 may suction outside air through the rear side of the second accommodation space 103 and discharge the suctioned air forward.

By the operation of the fan module 170, outside air may be introduced into the second accommodation space 103 from the rear side and both lateral sides of the appliance. For example, outside air introduced through a lower portion of the main body 100 may be introduced into the second accommodation space 103 through the air hole 104 formed in the rear side of the second accommodation space 103 after passing through a rear-side space of the appliance. Also, outside air may also be introduced into the second accommodation space 103 through the air hole 104 formed in any one lateral side of the second accommodation space 103. The air introduced into the second accommodation space 103 in this way may move forward inside the second accommodation space 103 and cool the electric components inside the second accommodation space 103.

The air introduced into the second accommodation space 103, as described above, may be suctioned into the duct portion 143 by the fan module 170. The air introduced into the duct portion 143 may be discharged to the front of the second accommodation space 103 through the exhaust port 122 after moving forward inside the duct portion 143.

As illustrated in FIG. 4, a water supply device 300 may be disposed inside the second accommodation space 103. The water supply device 300 may supply water used to generate steam in a steam supply device (not illustrated) and suppled to the accommodation space 101. As an example, the water supply device 300 may include a housing 310 fixed to the inside of the second accommodation space 103, the water tank 320 movably accommodated in the housing 310, and a pump 340 configured to pump water accommodated in the water tank 320 and supply the water to the steam supply device.

The water tank 320 may be withdrawn to the front of the appliance from the inside of the second accommodation space 103 by passing through the front panels 120 and 130. More specifically, the water tank 320 may be withdrawn to the front of the appliance from the inside of the second accommodation space 103 by passing through the second front panel 130. The steam supply device may heat water supplied by the water supply device 300 to generate steam, and the steam generated by the steam supply device may be supplied to the inside of the first accommodation space 101 through a steam nozzle.

Further, the appliance may further include an opening module 400. The opening module 400 may be disposed in the second accommodation space 103. The opening module 400 is provided to push the control panel 200 disposed at the closing position forward to move the control panel 200 toward the opening position. As an example, the opening module 400 may include a cam, which is provided to be rotatable, to push and move the control panel 200 forward. As another example, the opening module 400 may use a pushing bar, which is provided to be stretchable forward, to push and move the control panel 200 forward.

Meanwhile, a detection module 500 may be disposed in the second accommodation space 103. The detection module 500 may be provided to detect movement of the door 150 or other attribute.

[Schematic Configuration of Detection Module and Controller]

Figure 6:
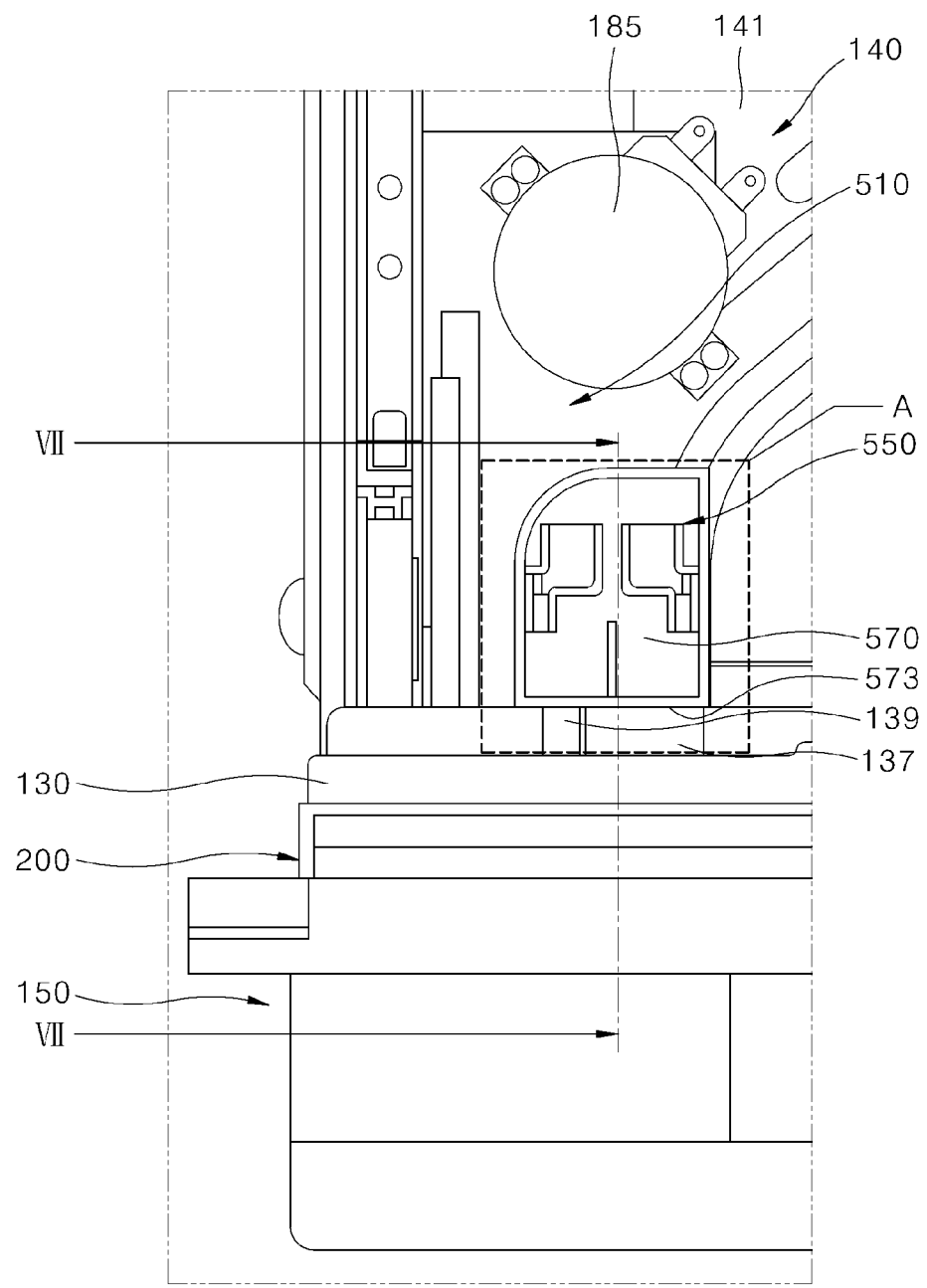
FIG. 6 is an enlarged view of portion "VI" of FIG. 4.
Figure 7:
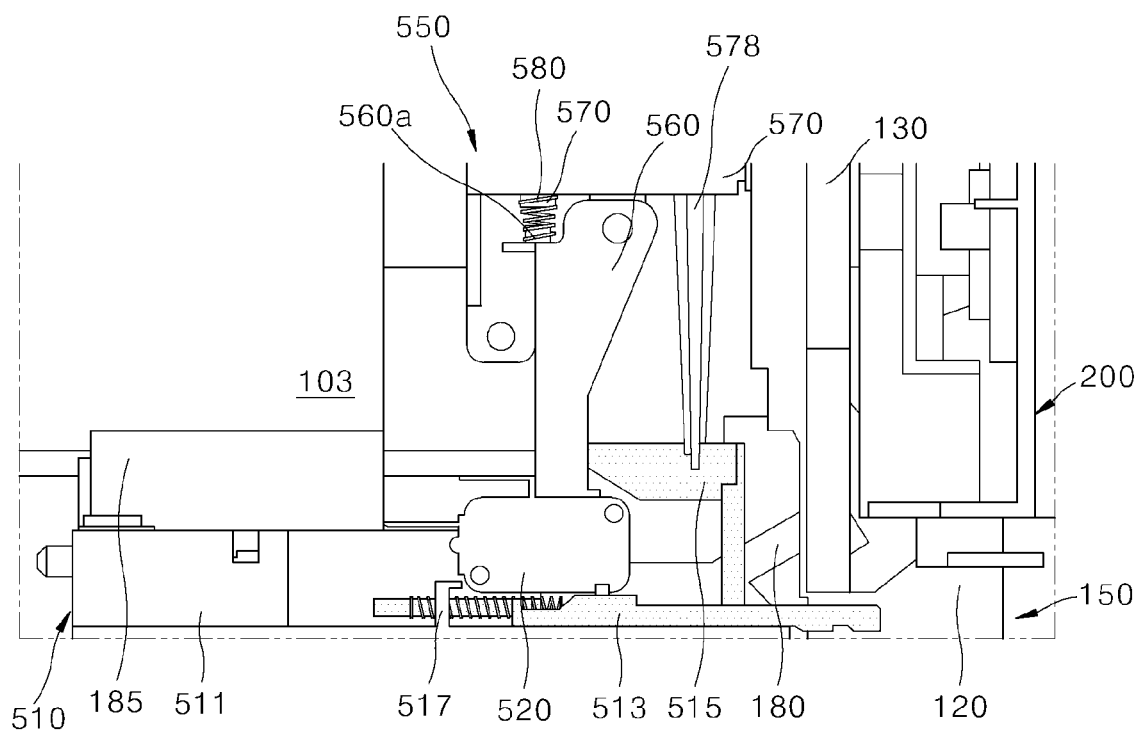
FIG. 7 is a cross-sectional view along line "VII-VII" of FIG. 6.

FIG. 6 is an enlarged view of portion "VI" of FIG. 4, and FIG. 7 is a cross-sectional view along line "VII-VII" of FIG. 6. Referring to FIGS. 5 to 7, the appliance of the present example may include the detection module 500 to detect various conditions of the appliance, and a controller 600 to operates a function of the appliance based on the sensed conditions, such as to selectively operate or turn off a lamp 190.

The detection module 500 may include a detection main body portion (or detection module main body) 510. The detection main body portion 510 may be installed at the main body 100. The detection main body portion 510 may be connected to the door 150 at a front side of the first accommodation space 101. The detection main body portion 510 connected to the door 150 in this way may receive a force generated due to movement of the door 150 as an input.

A first sensor 520 is provided to detect opening and closing of the door 150. The first sensor 520 may detect the force input to the detection main body portion 510 to detect opening and closing of the door 150.

In one example, the first sensor 520 may be provided in a form that includes a microswitch. The first sensor 520 may be turned on or off according to movement of an actuator protruding from the microswitch. For example, the first sensor 520 may be operated to be turned on when the door 150 is closed and turned off when the door 150 is opened. The first sensor 520 turned on due to detecting the force input to the detection main body portion 510 may output a first signal (e.g., a signal indicating that door 150 is closed), and operations of configurations set to be executed when the first signal is output or is not output may be controlled by the controller 600.

A second sensor 530 is provided to detect vibration input to the door 150. The second sensor 530 may detect the force input to the detection main body portion 510 and detect a vibration input to the door 150, for example, a vibration caused by a knock or other touch input. For example, the second sensor 530 may be operated to output a second signal when the vibration caused by the knock is detected.

The second sensor 530 may be a sensor that detects vibrations propagated by a medium. When a vibration generated at the door 150 due to a knock is transmitted to the second sensor 530 through a medium, the second sensor 530 may detect the vibration. As previously described, the second sensor 530 can also detect vibrations caused by other factors that are not associated with a knock. However, the second sensor 530 of the present example may be provided to especially differentiate and detect a vibration caused by a knock input by a user.

According thereto, the second sensor 530 of the present example may accurately differentiate between a vibration caused by a knock input by a user and a vibration caused by another factor. For example, the second sensor 530 may detect a vibration transmitted in a pattern that matches a specific pattern shown in a vibration caused by a knock as a vibration caused by a knock made by a user.

According to one example, the first sensor 520 and the second sensor 530 may be installed to share a single detection main body portion 510 and disposed to be adjacent to each other. In other examples, the first sensor 520 and the second sensor 530 may be provided at separate detection main body portions 510 that are spaced apart. For example, the first sensor 520 and the second sensor 530 may be provided at different sides of the second accommodation space 103 in a left-right direction.

Furthermore, the detection module 500 may further include a support assembly 550. The support assembly 550 may be provided to support the second sensor 530. The support assembly 550 may transmit a vibration transmitted through the detection main body portion 510 to the second sensor 530.

The controller 600 may control an operation of the appliance. For example, the controller 600 may control an operation of the heating portion 160, 165, the lamp 190, or the like based on an operation signal input received through the display, the input portion, or the like of the control panel 200. Also, the controller 600 may also control an operation of a display of the control panel 200 that is configured to display an operational state of the appliance. As an example, the controller 600 may be configured by a microcontroller mounted on a circuit board.

[Structures of Detection Main Body Portion, First Sensor, and Latch]

Figure 8:
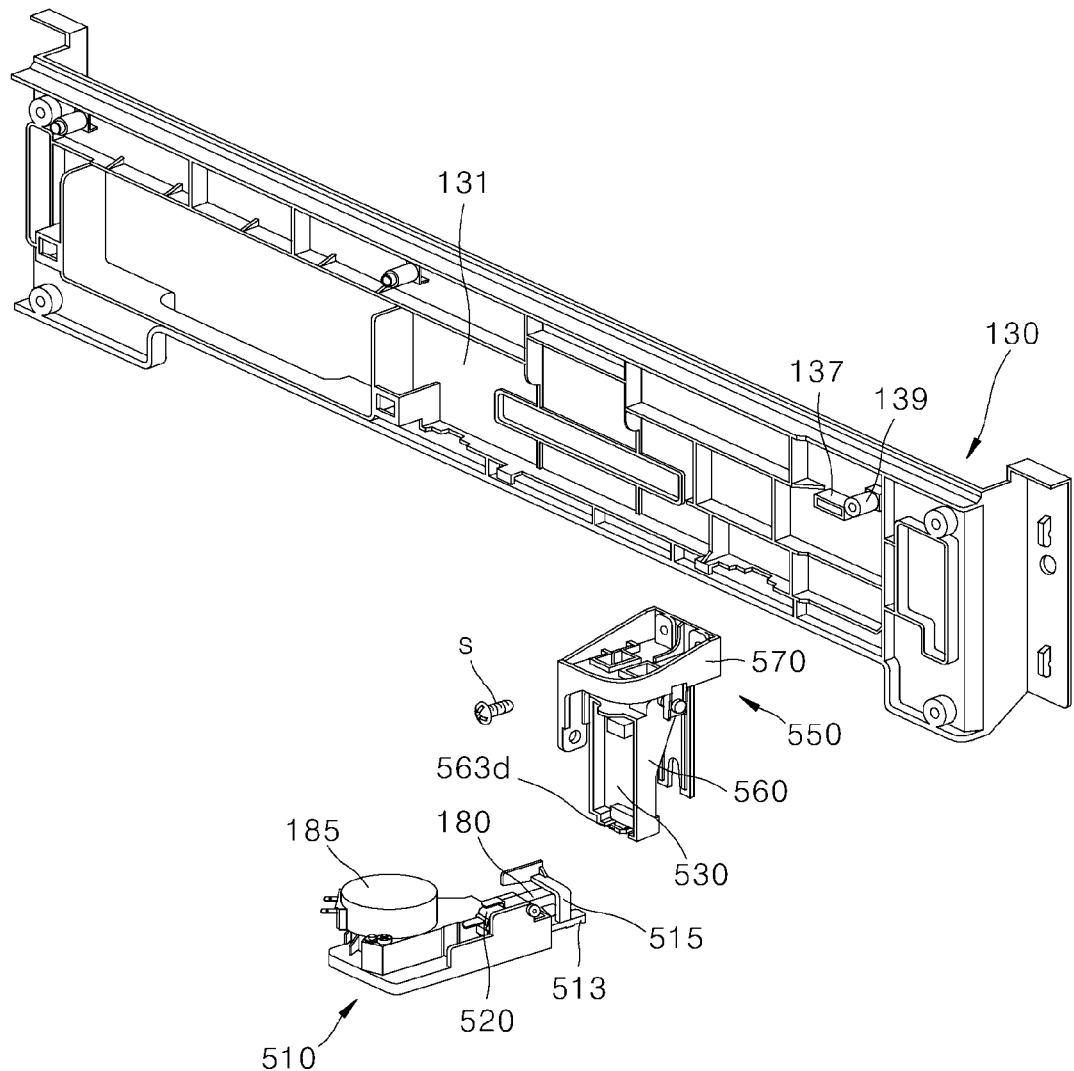
FIG. 8 is a back exploded perspective view separately illustrating a second front panel and a detection module of the appliance according to one example of the present disclosure.
Figure 9:
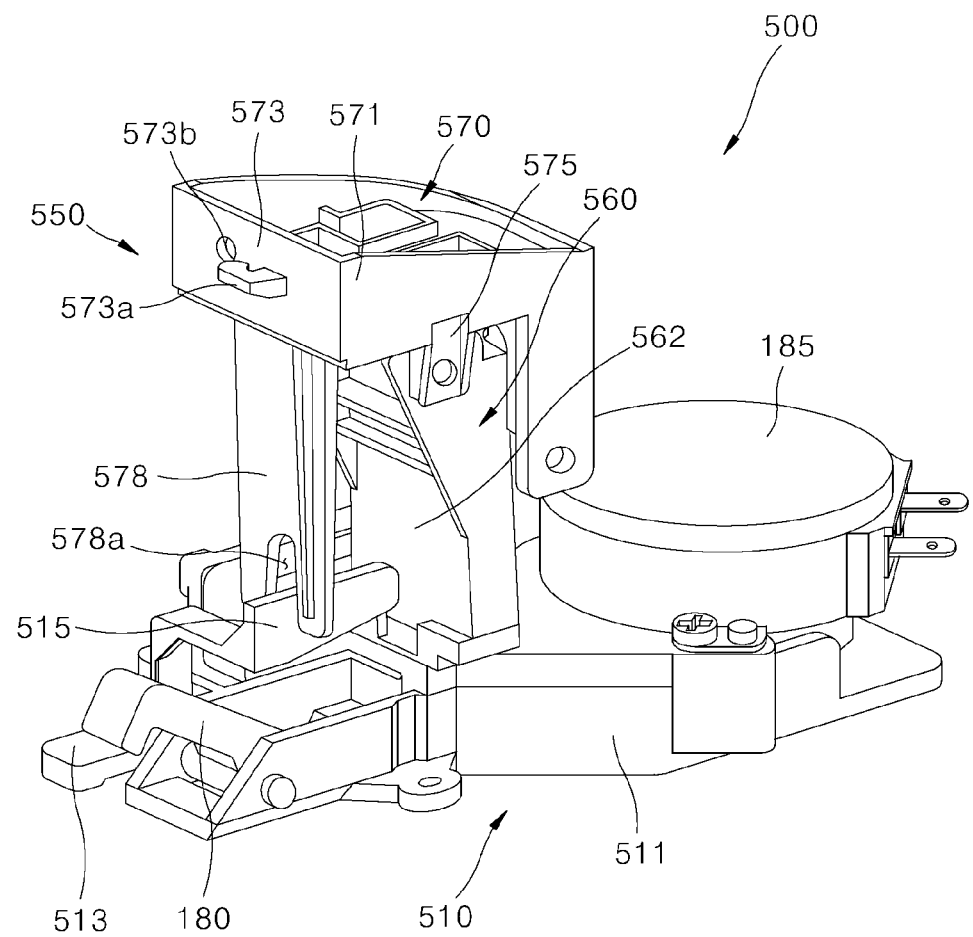
FIG. 9 is a back perspective view separately illustrating the detection module illustrated in FIG. 8.

FIG. 8 is a back exploded perspective view separately illustrating a second front panel and a detection module of the appliance according to one example of the present disclosure, and FIG. 9 is a back perspective view separately illustrating the detection module illustrated in FIG. 8.

Referring to FIGS. 5 to 9, the detection module 500 may include the detection main body portion 510, the first sensor 520, and the second sensor 530. The detection main body portion 510 may receive a force generated due to movement of the door 150 as an input and may transmit the received force to at least one of the first sensor 520 and the second sensor 530. The detection main body portion 510 may include a main supporter 511 and transmission members (or transmission plates) 513 and 515.

The main supporter 511 may be installed at the main body 100. For example, the main supporter 511 may be coupled to the upper panel 140 at an upper side of the upper panel 140. The main supporter 511 may support the first sensor 520 and the transmission members 513 and 515, and a latch 180 and a driving portion 185 which will be described below may also be supported by the main supporter 511.

The transmission members 513 and 515 may be movably installed at the main supporter 511, such as to be movable in the front-rear direction. For example, at least one of the transmission members 513 and 515 may receive a force generated due to movement of the door 150 as an input and move in the front-rear direction.

At least one of the transmission members 513 and 515 may be disposed between the first accommodation space 101 and the second front panel 130 in the up-down direction. For example, at least one of the transmission members 513 and 515 may be disposed at a lower side of the second front panel 130 and may be disposed at a rear area of the first front panel 120.

At least a portion of one or more of the transmission members 513 and 515 may be disposed between the cavity 110 and the door 150 in the front-rear direction. In one example, at least a portion of the transmission members 513 and 515 may pass through the first front panel 120 and may be disposed between the first front panel 120 and the door 150. To this end, a through-hole may be provided in the first front panel 120, and the through-hole may be formed to pass through the first front panel 120 in the front-rear direction. One or more of the transmission members 513 and 515 may pass through the first front panel 120 through the through-hole in the front-rear direction. At least a portion of one or more of the transmission members 513 and 515 may be exposed to the front of the first front panel 120.

The transmission members 513 and 515 may include a first transmitter (or sensor probe) 513. The first transmitter 513 may be provided to receive a force generated due to movement of the door 150 as an input and transmit the received force to the first sensor 520. As an example, the first transmitter 513 may be formed in the shape of a thin bar or shaft that extends in the front-rear direction. Also, at least a portion of the first sensor 520 may be disposed on a movement path of the first transmitter 513.

As an example, the first sensor 520 may be installed at an upper side of the first transmitter 513. The actuator of the first sensor 520 may be disposed to protrude downward toward the movement path of the first transmitter 513. In this case, by the first sensor 520 being turned on or off according to movement of the first transmitter 513, the first sensor 520 may detect opening and closing of the door 150. For example, in a state in which the actuator of the first sensor 520 is not in contact with the first transmitter 513, the first sensor 520 may remain turned off. While the first sensor 520 is turned off in this way, the controller 600 may recognize that the door 150 is open.

When the door 150 is open, the first transmitter 513 may be disposed at a front side of the first sensor 520. When the door 150 is closed, the first transmitter 513 may move rearward due to being pushed by the door 150 and come in contact with the actuator of the first sensor 520. When the actuator of the first sensor 520 moves while in contact with the first transmitter 513 as above, the first sensor 520 may be turned on and detect that the door 150 is closed.

The transmission members 513 and 515 may move to a rear side due to movement of the door 150 as described above. Also, the detection module 500 may further include a first elastic member 517. The first elastic member 517 may provide an elastic force that allows the transmission members 513 and 515 that have moved to the rear side to return to the front. As an example, the first elastic member 517 may include a coil spring that is compressed and stretched in the lateral direction. A rear end of the first elastic member 517 may be supported by the main supporter 511, and a front end of the first elastic member 517 may support the first transmitter 513.

The first transmitter 513 that has moved to the rear side due to being pushed by the door 150 during the closing of the door 150 may be elastically supported by the first elastic member 517 and come in close contact with the door 150. When the door 150 is opened, the first transmitter 513 may move toward a front side by an elastic force provided by the first elastic member 517 and, thus, return to the position where the first transmitter 513 was before the closing of the door 150.

The transmission members 513 and 515 may further include a second transmitter 515. The second transmitter 515 may be provided to receive a force generated due to movement of the door 150 as an input and transmit the received force to the second sensor 530.

According to one example, the first transmitter 513 may be movably installed at the main supporter 511 in the front-rear direction. The first transmitter 513 may be provided to come in contact with the door 150 at a front side of the first accommodation space 101. In the present example, the first transmitter 513 may come in contact with the door 150 at the front sides of the first accommodation space 101 and the second accommodation space 103. The second transmitter 515 may be provided to move in accordance with the above-described movement of the first transmitter 513. In one example, the first transmitter 513 and the second transmitter 515 are integrally formed and move as a whole.

In one example, the second sensor 530 may be disposed at an upper side of the first sensor 520. Considering this aspect, the second transmitter 515 may be formed to protrude upward from the first transmitter 513. The second transmitter 515 may be formed to protrude to a height at which the second transmitter 515 is able to come in contact with a supporter 560, which will be described below.

In one example, the first transmitter 513 may be formed in a linear shape that extends in the front-rear direction, for example, the shape of straight line. Also, the second transmitter 515 may protrude in an "L" shape from the first transmitter 513. According thereto, when viewed from a side, the first transmitter 513 may be formed in the shape of a straight line, and the second transmitter 515 may be formed to protrude in the shape of an "L" from the first transmitter 513. When the first transmitter 513 and the second transmitter 515 are formed in the above shapes, the the first transmitter 513 and the second transmitter 515 may be connected to combine to form the shape of a sideways "U" when viewed together from a side.

Also, in one example, the first sensor 520 and the second sensor 530 may be disposed to be spaced a predetermined distance apart from each other in the lateral direction. This positioning may prevent the support assembly 550 supporting the second sensor 530 from interfering with the first sensor 520 and a structure around the first sensor 520 that supports the first sensor 520.

As the first sensor 520 and the second sensor 530 are disposed to be spaced apart from each other in the lateral direction as described above, the second transmitter 515 may protrude in the shape of an inverted "L" from the first transmitter 513. That is, when viewed from the front, the second transmitter 515 may protrude in the shape of the inverted "L" from the first transmitter 513.

The second transmitter 515 may be formed as described above to move together with the first transmitter 513 and may transmit a vibration input to the door 150 to the second sensor 530. To this end, the second transmitter 515 may be connected to the support assembly 550. This will be described in detail below.

The above-described transmission members 513 and 515 may serve as media for transmitting a vibration input to the door 150 to the second sensor 530 while transmitting a force generated due to movement of the door 150 to the first sensor 520. The transmission members 513 and 515 may be formed of rigid bodies that do not cause attenuation of vibrations.

Meanwhile, the appliance of the present example may include a door locking device. The door locking device may be installed at a front surface of the main body 100. The door locking device may include the latch 180 provided to be caught in the door 150 and the driving portion 185 configured to operate the latch 180.

The driving portion 185 and the latch 180 may be connected by a link structure. While the door 150 is to remain closed (e.g., when the oven is in a cleaning mode), the latch may remain caught in the door 150. When the door is not to remain closed any more (e.g., after the cleaning mode is completed), the latch 180 caught in the door 150 may be released.

The latch 180 may be installed at the detection main body portion 510, a more specifically, at the main supporter 511. The latch 180 installed in this way may rotate forward and protrude to the front of the main body 100. The latch 180 may be caught in the door 150 by rotating forward and protruding to the front and may be detached from the door 150 by rotating rearward. A catching groove may be formed to be concave downward in an upper end of the door 150. The latch 180 is caught in the door 150 by being inserted into the catching groove, and accordingly, the door 150 can be locked by the door locking device.

The latch 180 may be installed to be exposed at the front surface of the main body 100 so that the latch 180 can protrude forward toward the door 150 when necessary. Also, the latch 180 may be disposed at a side above the door 150 to enter and exit the catching groove provided in the upper end of the door 150. The latch 180 may be disposed at a side above the door 150 by being installed at the main supporter 511 disposed in the second accommodation space 103.

As an example, by being disposed to be spaced apart from the first transmitter 513 in the lateral direction, the latch 180 may be disposed to not overlap with the movement path of the first transmitter 513. Also, the latch 180 may be disposed at an area of the main supporter 511 that is biased toward the front. Accordingly, the latch 180 may be disposed at a position where the latch 180 can protrude forward toward the door 150 while avoiding interference with the support assembly 550 which will be described below.

When the latch 180 is installed as described above, the driving portion 185 provided to operate the latch 180 may be installed at the main supporter 511. For example, the first sensor 520, the latch 180, and the driving portion 185 may be installed at the main supporter 511 together. As an example, the driving portion 185 may be disposed at rear sides of the latch 180 and the support assembly 550. The driving portion 185 may be disposed at a position where the driving portion 185 does not interfere with the support assembly 550 while being disposed to not overlap with the movement path of the first transmitter 513. The driving portion 185 may be disposed at a position where the driving portion 185 can be easily connected to the latch 180 to drive the latch 180 while not affecting the operations of the transmission members 513 and 515 and the support assembly 550.

According to example, the appliance may provide a self-cleaning function. Self-cleaning allows the inside of the first accommodation space 101 to be heated by the heating portion so that the temperature inside the first accommodation space 101 is maintained high for a long period of time, thus burning and removing contaminants therein. While self-cleaning is performed, the latch 180 may engage in the door 150, and the door 150 may be locked by the door locking device. According thereto, the latch 180 may remain inserted into the main body 100 at ordinary times and may protrude forward and be fixed to the door 150 only while self-cleaning is performed.

[Structure of Second Sensor]

As described above, the second sensor 530 may be disposed at the rear of the cavity 110 and the first accommodation space. The second sensor 530 may detect a vibration detection signal that corresponds to a vibration and may, based on the detected vibration detection signal, determine whether a knock has been input. For example, the second sensor 530 may determine that a knock has been made when a vibration detection signal of a preset threshold value or more is consecutively detected at certain time intervals (e.g., a double knock is detected).

Also, a vibration caused by a knock may be generated only in one axial direction of the three axial directions. For example, a vibration caused by a knock may be generated only in any one of the x-axis direction, the y-axis direction, or the z-axis direction. Considering this aspect, in order to determine whether a vibration has been caused by a knock, a direction of the vibration that has caused a vibration detection signal may be be detected.

As another example, the second sensor 530 may compare a pattern of a vibration detection signal caused by a knock and a pattern of an actually-detected vibration detection signal and, based on a result of the comparison, determine whether the vibration has been caused by a knock. A pattern of a vibration detection signal caused by a knock (hereinafter referred to as "preset knock signal") may be preset. The second sensor 530 may compare a pattern of an actually-detected vibration detection signal and a pattern of the preset knock signal and, based on a result of the comparison, determine whether the vibration has been caused by a knock.

The second sensor 530 may detect vibrations transmitted in all directions. As an example, the second sensor 530 may include a vibration sensor the detects vibrations along a plurality of axes. The second sensor 530 including the vibration sensor may detect vibrations transmitted in directions along the plurality of axes. For example, the second sensor 530 of the present example may detect a vibration corresponding to a knock by detecting vibrations transmitted in the three axial directions and combining vibration detection signals corresponding to the vibrations in the three axial directions.

As illustrated in FIG. 5, the second sensor 530 may include a three-axis sensor module 531 and a sensor microcomputer 533. As an example, the three-axis sensor module 531 may include a single three-axis acceleration sensor configured to simultaneously detect vibrations transmitted in the three axial directions orthogonal to one another. The three-axis acceleration sensor can detect three-axis components of acceleration using a single sensor. The three-axis acceleration sensor may detect a slight movement change (acceleration) of a medium due to vibration in each of the three axial directions orthogonal to one another.

The three-axis acceleration sensor may be installed so that any one of the three axial directions coincides with a direction of vibration caused by a knock. By the three-axis acceleration sensor being installed in this way, accuracy with which the second sensor 530 detects a vibration caused by a knock can be further improved.

As another example, the three-axis sensor module 531 may be provided to include three independent acceleration sensors. As still another example, the three-axis sensor module 531 may be provided to include four or more independent acceleration sensors. The greater the number of acceleration sensors, the higher the accuracy with which the second sensor 530 detects a vibration caused by a knock.

At least one of the plurality of acceleration sensors may be installed so that an axial direction in which a vibration is detected by the acceleration sensor coincides with a direction of vibration caused by a knock. When the direction of vibration caused by a knock and any one of the three axial directions are aligned in this way, accuracy with which the second sensor 530 detects a vibration caused by a knock can be further improved.

As yet another example, a one-axis acceleration sensor configured to detect a vibration in one axial direction and a two-axis acceleration sensor configured to detect vibrations in the other two axial directions may be applied to the second sensor 530. In this case, the second sensor 530 may be installed so that a direction of vibration caused by a knock made on the door coincides with the axial direction of any one-axis acceleration sensor.

Further, the second sensor 530 may further include a filter portion 535. A vibration detection signal detected by the second sensor 530 may include unnecessary noise in addition to a vibration detection signal caused by a knock input. The filter portion 535 may serve to remove such noise.

Also, the second sensor 530 may further include an amplifier 537. A signal output after the removal of noise therefrom by the filter portion 535 may be amplified by the amplifier 537. Also, the amplified signal may be input to the sensor microcomputer 533.

The sensor microcomputer 533 may be separately configured from the controller 600. In another example, the sensor microcomputer 533 may be implemented as software implemented by controller 600. The sensor microcomputer 533 may, based on the signal output from the amplifier 537, determine whether a vibration detected by the second sensor 530 is a vibration caused by a knock input by a user. When the corresponding vibration is determined to be the vibration caused by the knock input by the user, the sensor microcomputer 533 may send information relating thereto to the controller 600. For example, the sensor microcomputer 533 may, based on a result of comparing a pattern of a vibration detection signal generated by the three-axis sensor module 531 and a pattern of the preset knock signal, determine whether the vibration has been caused by a knock.

The sensor microcomputer 533 may extract a vibration detection signal in a set first direction among vibration detection signals in the three axial directions and may, using the extracted vibration detection signal in the first direction, determine whether the vibration has been caused by a knock. This is because the vibration caused by a knock is generated only in the first direction.

Also, when a vibration detection signal in a first direction is input with a magnitude of a preset first threshold value or more, and then a vibration detection signal is input in the same direction with a magnitude of a preset second threshold value or more within a set time range, the sensor microcomputer 533 may determine that the vibration detected by the second sensor 530 is a vibration caused by a knock.

For example, a knock may be made with a "knock-knock" sound, and vibrations corresponding to the "knock-knock" sound may be usually shown with signals of a greater magnitude than vibrations generated due to other reasons. Therefore, when vibration detection signals corresponding to the "knock-knock" sound have the magnitude of the first threshold value or more and the magnitude of the second threshold value or more, respectively, the sensor microcomputer 533 may determine that the vibration detected by the second sensor 530 is a vibration caused by a knock.

Also, the sensor microcomputer 533 may extract a vibration detection signal in any one axial direction (a first axial direction) that coincides with a direction of vibration caused by a knock among vibration detection signals in the three axial directions and may, based on a result of comparing the extracted vibration detection signal with vibration detection signals in the other two axial directions (second and third axial directions), determine whether the vibration has been caused by a knock. For example, when the maximum value of a vibration detection signal in at least one of the second axial direction and the third axial direction is greater than the maximum value of a vibration detection signal in the first axial direction, the sensor microcomputer 533 may determine that the vibration detected by the second sensor 530 is not a vibration caused by a knock.

When a signal corresponding to a vibration caused by a knock (hereinafter referred to as "knock-on signal") is received from the second sensor 530, more specifically, the sensor microcomputer 533, the controller 600 may turn the lamp 190 on or off according to the signal. In other example, the controller 600 may control other functions based on the second sensor 530 detecting the knock, such as to activate or deactivate a function of the appliance.

According to one example, the three-axis sensor module 531 and the sensor microcomputer 533 may be mounted on a single printed circuit board (PCB) and may be, together with the PCB, configured as the second sensor 530 in the form of an integrated module. Also, when the second sensor 530 additionally includes the filter portion 535 and the amplifier 537, the second sensor 530 may be configured in the form of an integrated module in which the three-axis sensor module 531, the sensor microcomputer 533, the filter portion 535, and the amplifier 537 may be mounted on a single PCB. By the second sensor 530 being implemented in the form of an integrated module as above, the installation of the second sensor 530 may be facilitated, and the installation position of the second sensor 530 may be set to various positions. As illustrated in FIGS. 5 to 9, the second sensor 530 may be easily installed at the supporter 560 of the support assembly 550 which will be described below. This will be described in detail below.

Meanwhile, the support assembly 550 may be installed at the main body 100 to support the second sensor 530 and may transmit vibrations transmitted through the transmission members 513 and 515 to the second sensor 530. The support assembly 550 may include the supporter 560 and a supporter holder 570. The supporter 560 may be provided to support the second sensor 530, and the supporter holder 570 may be installed at the main body 100 to support the supporter 560 so that the posture of the supporter 560 is able to be changed. Hereinafter, a specific structure of each configuration of the detection module, including the support assembly 550, will be described.

[Schematic Structure of Support Assembly]

The support assembly 550 may be installed at the main body 100. In one example, the support assembly 550 is installed at the second front panel 130. According thereto, the support assembly 550 may be coupled to the second front panel 130 at a rear side of the second front panel 130.

The support assembly 550 may be disposed in the second accommodation space 103 and include the supporter 560. The supporter 560 may be provided to support the second sensor 530. The supporter 560 is provided so that the posture thereof may be changed due to vibrations transmitted by the transmission members 513 and 515. In accordance with the change in posture of the supporter 560, the position of the second sensor 530 in the front-rear direction may be changed.

Also, the support assembly 550 may further include the supporter holder 570. The supporter holder 570 may be installed at the main body 100 and support the supporter 560 so that the posture thereof is able to be changed. The supporter holder 570 may support the supporter 560 so that the supporter 560 is able to rotate about an axis in the lateral direction.

[Structure of Supporter]

Figure 10:
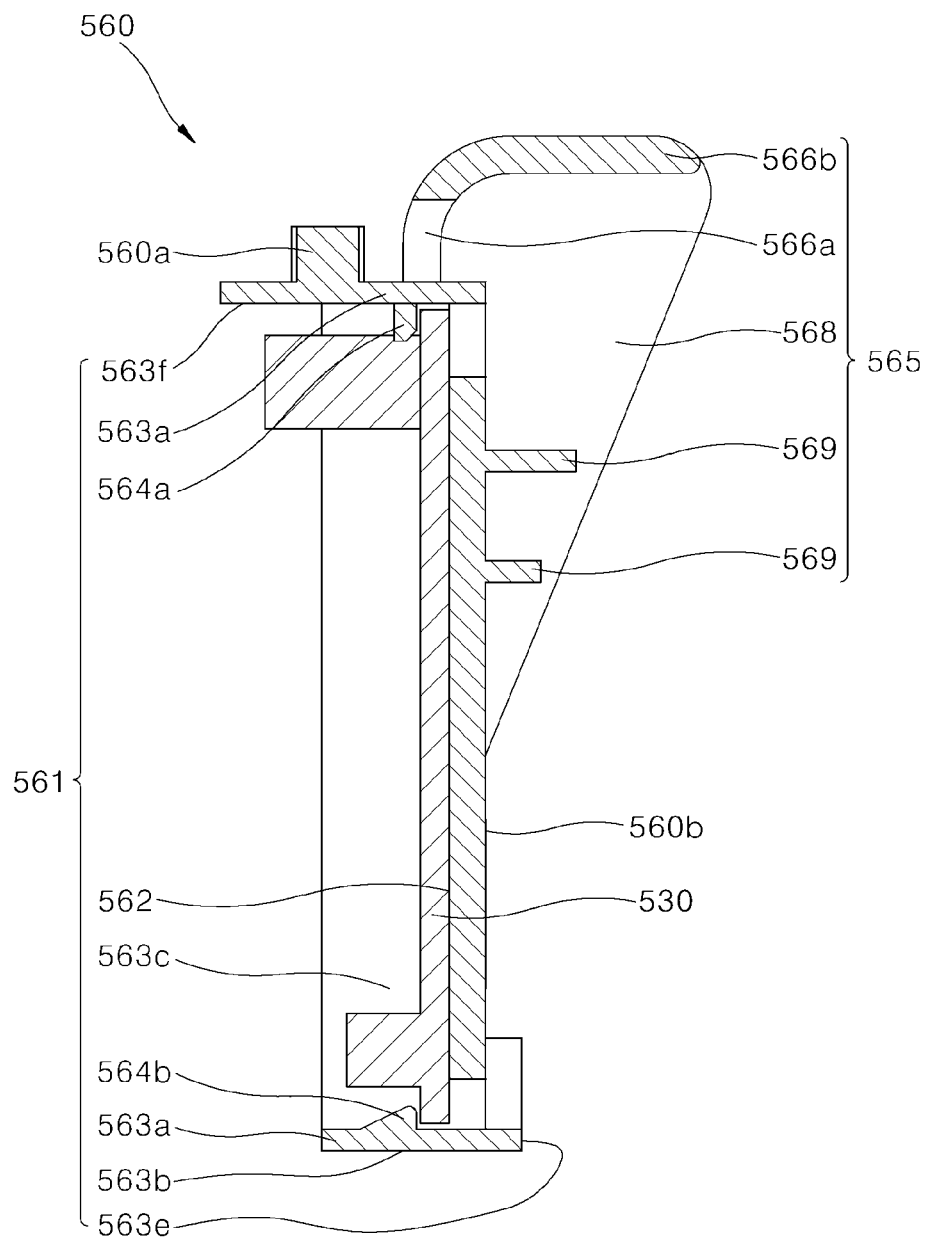
FIG. 10 is a lateral cross-sectional view illustrating an internal structure of a supporter illustrated in FIG. 9.

FIG. 10 is a lateral cross-sectional view illustrating an internal structure of a supporter illustrated in FIG. 9. Referring to FIGS. 7 to 10, the supporter 560 may include a sensor support portion (or sensor support region) 561 and a rotation support portion (or rotation support region) 565.

The sensor support portion 561 corresponds to an area of the supporter 560 that supports the second sensor 530. The sensor support portion 561 may include a rear support surface 562.

The rear support surface 562 may be a surface disposed between the PCB on which the second sensor 530 is mounted and the transmission members 513 and 515 to support the PCB. The rear support surface 562 may be formed as a plane having a shape that corresponds to the shape of a plane of the PCB. For example, each of the PCB and the rear support surface 562 may be formed in the shape of a quadrangular plane. The PCB on which the second sensor 530 is mounted may come in close contact with the rear support surface 562 and may be coupled to the sensor support portion 561.

The sensor support portion 561 may further include sidewalls 563a, 563b, and 563c. The sidewalls 563a, 563b, and 563c may extend in a direction orthogonal to the rear support surface 562 from an edge of the rear support surface 562. Each of the sidewalls 563a, 563b, and 563c may be disposed at one edge of the rear support surface 562, and the sidewalls 563a, 563b, and 563c provided in this way may surround the rear support surface 562 from outer sides thereof, for example, outer sides thereof in the up-down direction and the left-right direction. The PCB on which the second sensor 530 is mounted may be accommodated in a space surrounded by the rear support surface 562 and the sidewalls 563a, 563b, and 563c and may be coupled to the sensor support portion 561. For example, the rear support surface 562 may be formed in the shape of a quadrangular plane, and a composite body of the rear support surface 562 and the sidewalls 563a, 563b, and 563c may be formed in a hexahedral shape that has a space formed therein and an open front.

Also, the sensor support portion 561 may further include fastening protrusions 564a and 564b. The fastening protrusions 564a and 564b may be formed to protrude from the sidewalls. The PCB may be fitted between the rear support surface 562 and the fastening protrusions 564a and 564b and may be detachably coupled to the sensor support portion 561. The fastening protrusions 564a and 564b may include a first fastening protrusion 564a and a second fastening protrusion 564b. The first fastening protrusion 564a may be disposed at an upper end of the sensor support portion 561, and the second fastening protrusion 564b may be disposed at a lower end of the sensor support portion 561.

The first fastening protrusion 564a may be formed to protrude from an upper-end sidewall 563a disposed at the upper end of the sensor support portion 561 among the sidewalls 563a, 563b, and 563c. The first fastening protrusion 564a may be formed to protrude from the upper-end sidewall 563a so that the first fastening protrusion 564a is disposed to be spaced a predetermined distance apart from the rear support surface 562. For example, the first fastening protrusion 564a may be disposed to be spaced apart from the rear support surface 562 by a distance corresponding to a thickness of the PCB. The PCB and the supporter 560 may be coupled to each other as one portion of an upper side of the PCB is fitted between the rear support surface 562 and the first fastening protrusion 564a.

Also, the first fastening protrusion 564a may be provided to be elastically deformable in the thickness direction of the PCB and may be disposed to be spaced apart from the rear support surface 562 by a distance that is slightly shorter than the thickness of the PCB. The first fastening protrusion 564a may bring the PCB into close contact with the rear support surface 562 and may fix the upper side of the PCB to the supporter 560.

The second fastening protrusion 564b may be formed to protrude in the shape of a hook from a lower-end sidewall 563b disposed at the lower end of the sensor support portion 561 among the sidewalls 563a, 563b, and 563c. The second fastening protrusion 564b may be formed to protrude from the lower-end sidewall 563b so that the second fastening protrusion 564b is disposed to be spaced a predetermined distance apart from the rear support surface 562.

A cut portion (or groove) 563d formed by one portion of the lower-end sidewall 563b being cut in a direction parallel to a protruding direction of the lower-end sidewall 563b may be provided in the lower-end sidewall 563b. For example, the cut portion 563d may be formed by one portion of the lower-end sidewall 563b being cut rearward from a front end of the lower-end sidewall 563b. Also, a pair of cut portions (or grooves) 563d may be provided in the lower-end sidewall 563b. The pair of cut portions 563d may be disposed to be spaced apart from each other in the left-right direction with the second fastening protrusion 564b disposed therebetween. Accordingly, one portion of the lower-end sidewall 563b that is disposed between the pair of cut portions 563d reaches a state in which the shape thereof can be changed in the up-down direction.

According to one example, the portion of the lower-end sidewall 563b that is disposed between the pair of cut portions 563d (hereinafter referred to as "cut surface") may have a shape that is changeable in the up-down direction and may be provided to be elastically deformable. For example, the cut surface may be elastically deformed in the up-down direction about a front-side end thereof adjacent to the rear support surface 562. The cut surface may serve as a body supporting the second fastening protrusion 564b. For example, the cut surface may be provided in the form of a hook body that forms a hook member together with the second fastening protrusion 564b which is in the form of a hook protrusion.

According to one example, the PCB and the supporter 560 may be coupled to each other as one portion of a lower side of the PCB is fitted between the rear support surface 562 and the second fastening protrusion 564b. Here, the PCB may be fitted between the rear support surface 562 and the second fastening protrusion 564b by pushing the second fastening protrusion 564b downward and passing through an area in which the second fastening protrusion 564b is disposed.

Also, the PCB fitted between the rear support surface 562 and the second fastening protrusion 564b may be separated from the supporter 560 in a state in which a force is applied so that the second fastening protrusion 564b is bent downward. In this way, the PCB may be detachably coupled to the supporter 560 by the hook member including the second fastening protrusion 564b and the cut surface. Also, an elastic deformation of the hook member may be made possible by the pair of cut portions 563d formed in the lower-end sidewall 563b.

Also, the sensor support portion 561 may further include a contact surface 560b. The contact surface 560b may be provided as a surface that comes in contact with the transmission members 513 and 515 at a side opposite to the rear support surface 562. For example, the contact surface 560b may correspond to a back surface of the rear support surface 562 that is provided at the same member as the contact surface 560b. For example, in a single member constituting the supporter 560, the contact surface 560b may form a front surface of the member, and the rear support surface 562 may form a rear surface of the same member.

Further, the supporter 560 may further include an extending portion (or extension) 563e. The extending portion 563e may be formed to extend forward from the lower-end sidewall 563b. Due to the extending portion 563e, the lower-end sidewall 563b may be formed to protrude further toward the front than the rear support surface 562. For example, the lower-end sidewall 563b may be formed to protrude further toward the front than the other sidewalls 563a and 563c by as much as the length of the extending portion 563e.

As a result, the length of the lower-end sidewall 563b in the front-rear direction may be increased, and accordingly, the length of the cut surface, which is formed in the lower-end sidewall 563b, in the front-rear direction may also be increased. An increase in the length of the cut surface in the front-rear direction indicates an increase in the length of the hook body in the hook member. As the length of the hook body is increased in the hook member, a width of deformation of the hook member in the up-down direction, more specifically, a width of movement of the second fastening protrusion 564b in the up-down direction, may be further increased. Accordingly, because the hook member and the second fastening protrusion 564b forming the hook member can be further bent downward, detachment of the PCB can be more easily and stably performed.

The rotation support portion (or rotation support region) 565 may be provided to rotatably couple the sensor support portion 561 to the supporter holder 570 in the front-rear direction. The rotation support portion 565 may include support legs 566a and 566b and a pair of rotation protrusions 567.

The support legs 566a and 566b may be provided to protrude rearward and upward from the rear support surface 562. In the present example, the support legs 566a and 566b include a first leg portion 566a and a second leg portion 566*b*. The first leg portion 566*a* may be formed to protrude upward from an upper end of the rear support surface 562. Also, the second leg portion 566*b* may be formed to extend rearward from an upper end of the first leg portion 566*a*.

In one example, the first leg portion 566*a* and the second leg portion 566*b* are connected together to combine to form an inverted "L" shape. In a state in which the sensor support portion 561 and the supporter holder 570 are spaced apart from each other in the up-down direction, the first leg portion 566*a* may extend from the sensor support portion 561 toward the supporter holder 570. Also, the second leg portion 566*b* may form a plane that is substantially parallel to a plane formed by a bottom support surface of the supporter holder 570.

The pair of rotation protrusions 567 may protrude from the support leg portions 566*a* and 566*b* toward one side and the other side in the left-right direction. Each of the rotation protrusions 567 may be rotatably coupled to the supporter holder 570. As an example, each of the rotation protrusions 567 may be rotatably coupled to the supporter holder 570, more specifically, a rotation protrusion support 575 which will be described below, in the front-rear direction.

Also, the rotation support portion 565 may further include a side support surface 568. The side support surface 568 may be formed in the shape of a plane that may connect the support legs 566*a* and 566*b* to the rear support surface 562 or the contact surface 560*b* at both sides of the rear support surface 562 or the contact surface 560*b* in the lateral direction. As an example, the side support surface 568 may be formed in the shape of a plane connected to the rear support surface 562 or the contact surface 560*b* and connected to the first leg portion 566*a* and the second leg portion 566*b*. A lower end of the side support surface 568 may be connected to the rear support surface 562 or the contact surface 560*b*.

Also, a rear end of the side support surface 568 may be connected to the rear support surface 562 or the contact surface 560*b* and connected to the first leg portion 566*a*. Also, an upper end of the side support surface 568 may be connected to the second leg portion 566*b*. The side support surface 568 connected to the rear support surface 562 or the contact surface 560*b* and connected to the support legs 566*a* and 566*b* in this way may be formed in a substantially triangular shape when viewed from a side.

The side support surface 568 may be disposed at both sides of the supporter 560 in the left-right direction. For example, a pair of side support surfaces 568 may be provided at the supporter 560. The side support surfaces 568 provided in this way may serve to strengthen the rigidity of the supporter 560.

Also, the side support surfaces 568 may serve to suppress an occurrence of flexural deformation of the support leg portions 566*a* and 566*b*, particularly, the second leg portion 566*b*. When the supporter 560 further rotates forward or rearward while the second leg portion 566*b* is in contact with the supporter holder 570, an external force that causes flexural deformation of the second leg portion 566*b* in the downward direction may act on the second leg portion 566*b*. In order to prevent the flexural deformation of the second leg portion 566*b* from occurring due to the external force acting in this way, the side support surfaces 568 may serve to support the second leg portion 566*b* from both sides. Further, the side support surfaces 568 may also serve to limit a movement range of the transmission members 513 and 515 in the left-right direction so that the transmission members 513 and 515 coming in contact with the contact surface 560*b* are not detached to the outside of the contact surface 560*b* in the left-right direction.

Also, the rotation support portion 565 may further include a side rib 569. The side rib 569 may be formed to protrude forward from the contact surface 560*b*. A plurality of side ribs 569 may be disposed at the rotation support portion 565. Also, each of the side ribs 569 may be formed to extend in the horizontal direction. The side ribs 569 provided in this way are protruding structures formed on the supporter 560 and may serve to improve the strength of the supporter 560.

Also, the side ribs 569 may be disposed at an upper side of an area where contact between the contact surface 560*b* and the transmission members 513 and 515 mostly occurs. The side ribs 569 may serve to support the transmission members 513 and 515 from an upper side to prevent the transmission members 513 and 515 from being excessively pushed upward on the contact surface 560*b* in the process in which the transmission members 513 and 515 push the supporter 560 while in contact with the contact surface 560*b*.

[Structure of Supporter Holder]

The supporter holder 570 may support the supporter 560 so that the supporter 560 can rotate about an axis in the left-right direction. In one example, the supporter holder 570 includes a holder main body 571 and the rotation protrusion support 575. The holder main body 571 may form the frame of the supporter 560 and may be coupled to the rear of the cavity 110. The holder main body 571 may be disposed at a lower portion of the supporter 560. A support surface may be formed at a bottom side of the holder main body 571 that faces the supporter 560. As an example, the support surface may be formed in the shape of a quadrangular plane disposed in the horizontal direction.

Also, a coupling surface 573 may be provided at the holder main body 571. The coupling surface 573 may be a portion of supporter holder 570 that is used for coupling the supporter holder 570 to the back surface of the cavity 110. The coupling surface 573 may be formed in the shape of a plane disposed at a front surface of the holder main body 571.

Meanwhile, the support assembly 550 may further include a second elastic member 580. The second elastic member 580 may be provided to elastically support the supporter 560 from a portion under the supporter 560. Due to the second elastic member 580, the supporter 560 may remain biased forward toward the door 150. For example, a lower end of the supporter 560 may remain more biased forward than an upper end of the supporter 560 that is adjacent to the center of rotation of the supporter 560.

As an example, the second elastic member 580 may be provided in the form of a coil spring. A lower end of the second elastic member 580 in the form of a coil spring may be coupled to the supporter 560, and an upper end of the second elastic member 580 may be coupled to the supporter holder 570. Also, the second elastic member 580 in the form of a coil spring may be disposed at a position spaced apart toward a rear from the center of rotation of the supporter 560. For example, the second elastic member 580 may be disposed at a position spaced apart toward a rear from the rotation protrusion 567. For example, the second elastic member 580 may be disposed to be biased toward a rear end of the supporter 560.

Meanwhile, the supporter holder 570 may further include a first spring support portion (or first spring support protrusion) 577, and the sensor support portion 561 may further include a second spring support portion (or second spring support protrusion) 560*a*. The first spring support portion 577 may protrude downward from the holder main body 571 and support the upper end of the second elastic member 580. According to an example, the first spring support portion 577 may be formed in a cylindrical shape that protrudes downward from a bottom surface of the holder main body 571. The upper end of the second elastic member 580 in the form of a coil spring may surround the first spring support portion 577 from an outer side thereof in a radial direction and may be seated on the support surface of the holder main body 571. Also, the first spring support portion 577 may be fitted into the second elastic member 580.

The second spring support portion 560a may protrude upward from the upper-end sidewall 563a disposed at the upper end of the sensor support portion 561 and may be coupled to or otherwise support the lower end of the second elastic member 580. According to an example, the sensor support portion 561 may further include a protruding surface portion (or protruding surface extension) 563f. The protruding surface portion 563f may be formed to protrude rearward from the upper-end sidewall 563a. In one example, the protruding surface portion 563f protrudes rearward from the upper-end sidewall 563a and may be formed to protrude in a semicircular shape that corresponds, for example, to the shape of a second half portion of the second elastic member 580 or the shape of a second half portion of the second spring support portion 560a.

The second spring support portion 560a may be formed in a cylindrical shape that extends upward from the upper-end sidewall 563a. At least a portion of the second spring support portion 560a may protrude from the protruding surface portion 563f and be disposed more toward the rear than the upper-end sidewall 563a. For example, the second spring support portion 560a may be disposed at a position biased rearward from the supporter 560 by as much as a position at which the protruding surface portion 563f protrudes.

The lower end of the second elastic member 580 provided in the form of a coil spring may surround the second spring support portion 560a from an outer side thereof in the radial direction and may come in close contact with the protruding surface portion 563f and the upper-end sidewall 563a. The upper end of the second elastic member 580 may be supported by the protruding surface portion 563f and the upper-end sidewall 563a. Also, the second spring support portion 560a may be fitted into the second elastic member 580.

When the supporter 560 rotates rearward, the second elastic member 580 may be compressed as the lower end of the second elastic member 580 moves upward. The second elastic member 580 compressed upward in this way may, when an external force that has caused the supporter 560 to rotate rearward is released, provide an elastic force for rotating the supporter 560 forward again. For example, the supporter 560 may rotate in the front-rear direction, and the second elastic member 580 may be compressed or stretched in the up-down direction. Also, due to the elastic force provided by the second elastic member 580, the supporter 560 may come in close contact with the transmission members 513 and 515.

Further, the second elastic member 580 may be provided in the form of a coil spring and may be formed in the shape of a circular truncated cone whose diameter gradually increases upward. According to an example, the supporter 560 may rotate in the front-rear direction, and the second elastic member 580 may be compressed or stretched in the up-down direction. However, since the second elastic member 580 coupled to the supporter 560 may be affected by the supporter 560 moving in the front-rear direction, the shape of the second elastic member 580 may be changed in the front-rear direction which is a rotating direction of the supporter 560, as well as the up-down direction which is a direction in which the second elastic member 580 is compressed or stretched.

Considering this aspect, the second elastic member 580 may be provided in the form of a coil spring having the shape of a circular truncated cone whose diameter gradually increases upward. The second elastic member 580 provided in the form of a coil spring having the shape of a circular truncated cone in this way may, in the process in which the rotation of the supporter 560 is repeated, suppress a lower side surface and an upper side surface of the second elastic member 580 from being fitted to or caught in each other after coming in contact with each other. Also, due to having a further expanded base side (upper surface) than typical coil springs, the second elastic member 580 provided in the above-described form can be more stably coupled to the supporter holder 570 and may provide an effect of stably supporting the supporter 560.

The rotation protrusion support 575 may be provided to rotatably couple the supporter 560 to the supporter holder 570. The rotation protrusion 567 may be rotatably coupled to the rotation protrusion support 575 in the front-rear direction. As an example, a pair of rotation protrusion supports 575 may be provided at the supporter holder 570, and the pair of rotation protrusion supports 575 may be disposed to be spaced a predetermined distance apart from each other in the lateral direction.

For example, the rotation protrusion supports 575 may be disposed at both side ends of a supporter main body 571 in the lateral direction. For example, the pair of rotation protrusion supports 575 may be disposed to be spaced apart from each other in the lateral direction with the supporter main body 571 disposed therebetween.

Each of the rotation protrusion supports 575 may be formed to protrude downward from the supporter main body 571. In a state in which the supporter 560 is fitted between the pair of rotation protrusion supports 575 provided in this way, the pair of rotation protrusions 567 provided at the supporter 560 may be rotatably coupled to the pair of rotation protrusion supports 575 in the front-rear direction. In this way, the supporter 560 can be rotatably installed at the supporter holder 570 in the front-rear direction.

The supporter holder 570 may further include a front wall body 578. The front wall body 578 may protrude downward from the holder main body 571 and may be disposed at a front side of the supporter 560. For example, the supporter holder 570 may protrude downward from a front-side end of the holder main body 571 and may form a wall surface that covers the supporter 560 from the front side.

In one example, an upper end of the second transmitter 515 may be disposed at a higher position than a lower end of the front wall body 578. For example, the front wall body 578 may be formed to have a length that allows the front wall body 578 to come in contact with the second transmitter 515.

A through-hole 578a may be provided in the front wall body 578. The through-hole 578a may be formed to pass through the front wall body 578 in the front-rear direction. The transmission members 513 and 515 may pass through the front wall body 578 through the through-hole 578a. As an example, the through-hole 578a may be formed in the shape of an upward slit in a lower end of the front wall body 578. Here, the length of the through-hole 578a in the lateral direction may be formed to be similar to, but longer than, the length of the transmission members 513 and 515 in the lateral direction.

The through-hole 578a formed as described above may serve to guide the position of the detection main body portion 510 relative to the support assembly 550 and the position of the support assembly 550 relative to the detection main body portion 510 while providing a passage necessary for the transmission members 513 and 515 to pass through the front wall body 578. As the transmission members 513 and 515 are inserted into a narrow gap formed by the through-hole 578a, the positions of the transmission members 513 and 515 relative to the supporter holder 570 may be guided. As the positions of the transmission members 513 and 515 relative to the supporter holder 570 are guided in this way, the installation position of the entire support assembly 550 including the supporter holder 570 and the installation position of the entire detection main body portion 510 including the transmission members 513 and 515 can be guided relative to each other.

[Coupling Structure Between Second Front Panel and Supporter Holder]

Figure 11:
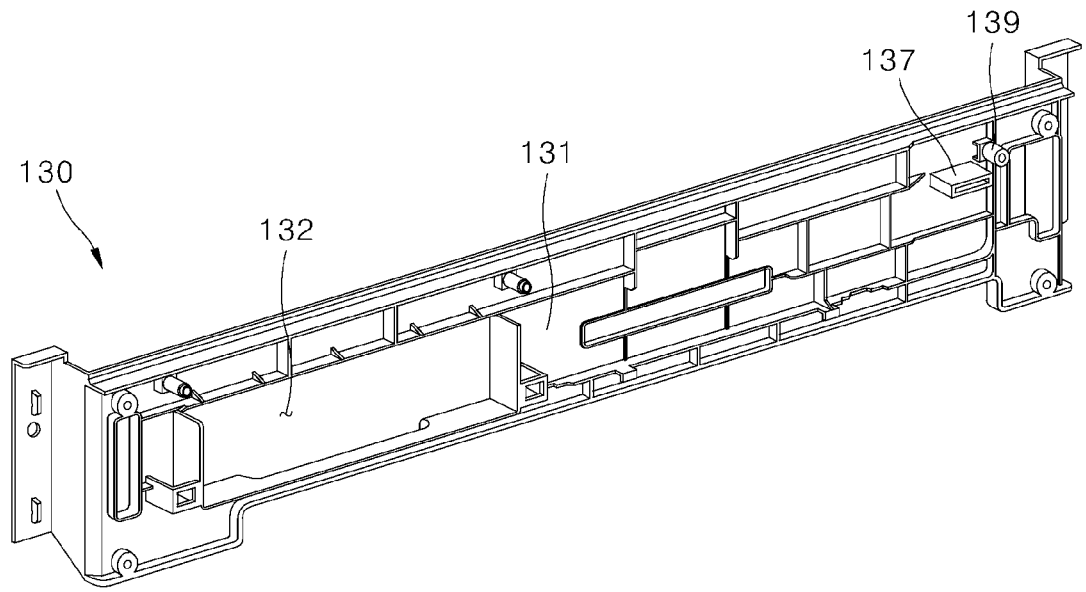
FIG. 11 is a back perspective view separately illustrating the second front panel illustrated in FIG. 8.
Figure 12:
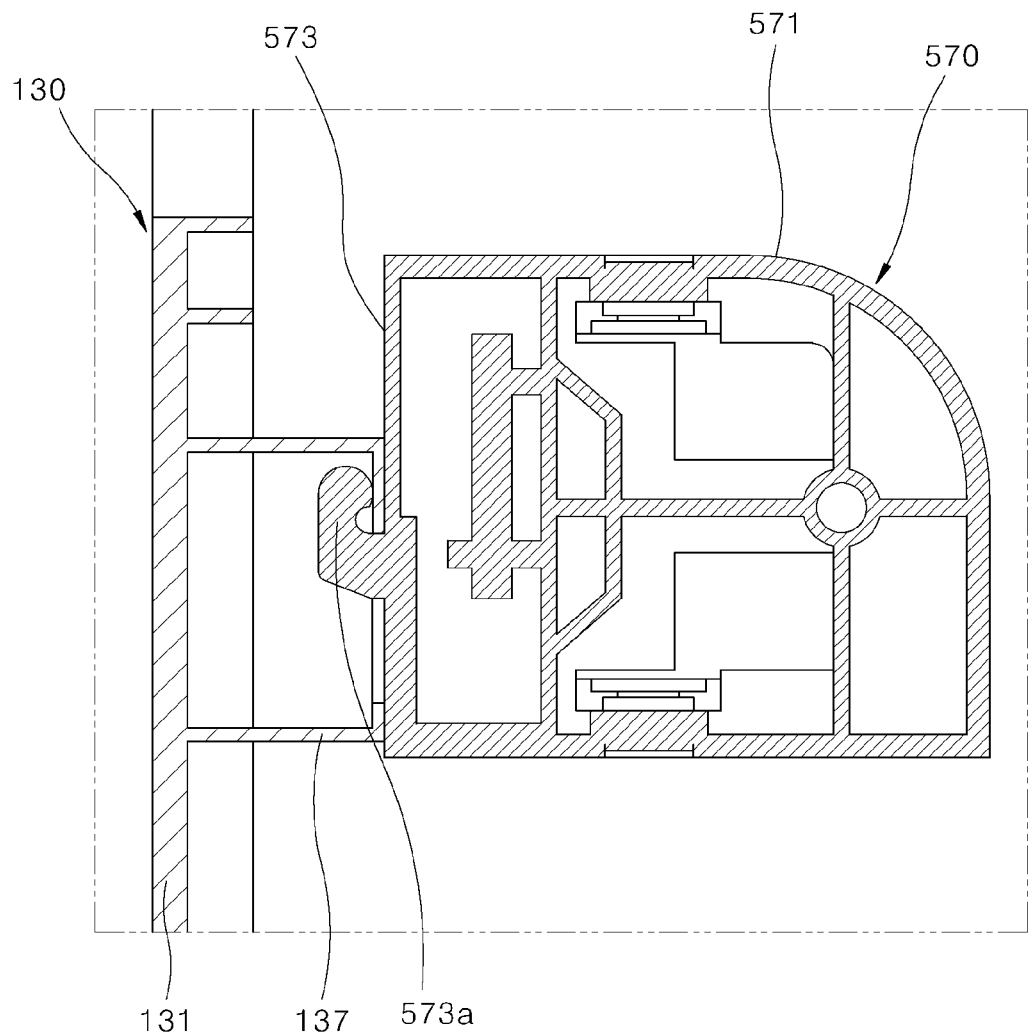
FIG. 12 is a plan cross-sectional view showing a coupling structure between a fitting boss and a fitting protrusion that are illustrated in portion "A" of FIG. 6.
Figure 13:
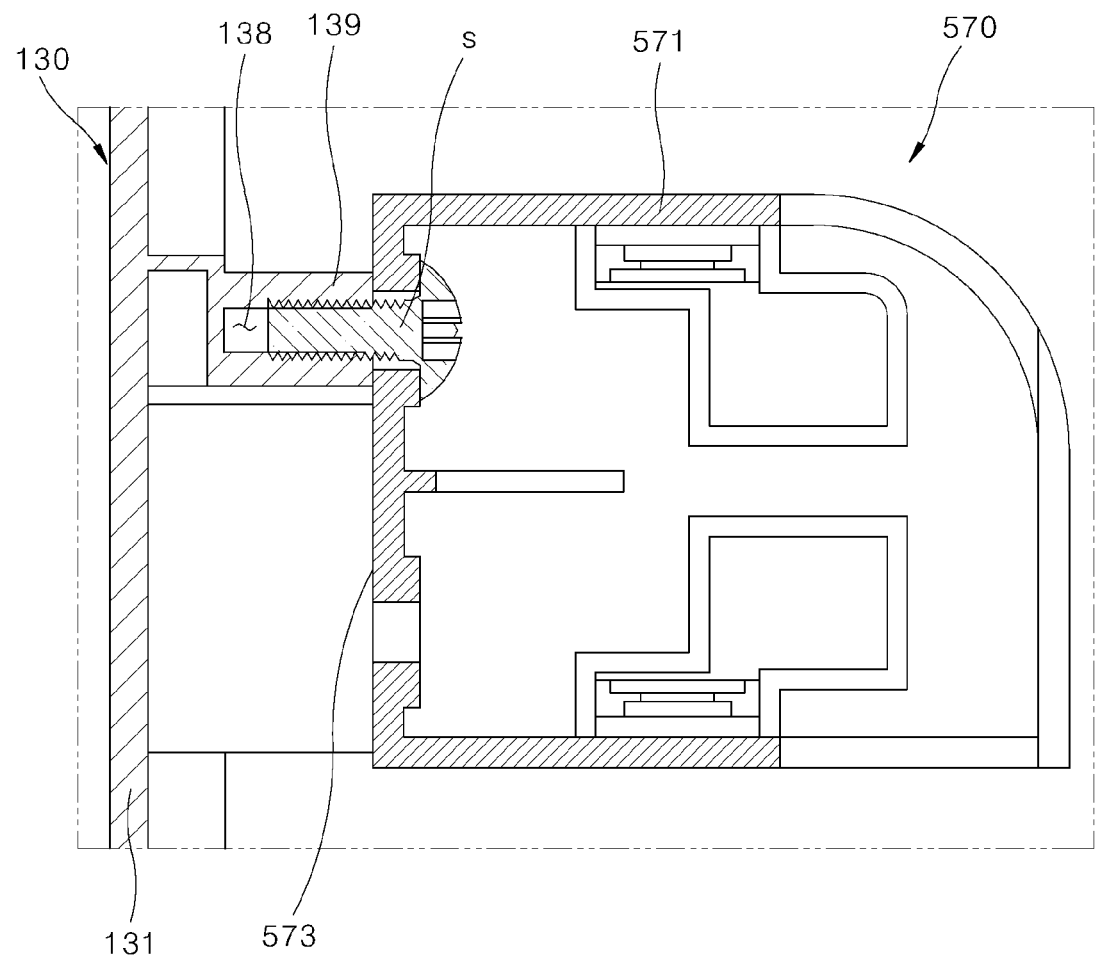
FIG. 13 is a plan cross-sectional view showing a coupling structure between a fastening boss and a fastening member that are illustrated in portion "A" of FIG. 6.

FIG. 11 is a back perspective view separately illustrating the second front panel illustrated in FIG. 8, FIG. 12 is a plan cross-sectional view showing a coupling structure between a fitting boss and a fitting protrusion that are illustrated in portion "A" of FIG. 6, and FIG. 13 is a plan cross-sectional view showing a coupling structure between a fastening boss and a fastening member that are illustrated in portion "A" of FIG. 6.

Referring to FIGS. 9 and 11, a fitting boss 137 may be provided on the front panels 120 and 130. The fitting boss 137 may be provided for coupling between the support assembly 550 and the front panels 120 and 130. The fitting boss 137 may be formed to protrude rearward from the front panels 120 and 130.

Also, a first fastening hole 138 may be provided in the front panels 120 and 130. The first fastening hole 138 may be formed to pass through the front panels 120 and 130 in the front-rear direction. The first fastening hole 138 may be disposed to be spaced apart from the fitting boss 137 in the lateral direction.

In one example, the support assembly 550 may be installed at the second front panel 130. Accordingly, the fitting boss 137 may be provided on the second front panel 130. Also, the first fastening hole 138 may also be formed to pass through the second front panel 130.

Generally, the first front panel 120 may be formed of a metal material to withstand high-temperature heat while securing structural rigidity. On the other hand, the second front panel 130 may be formed of a synthetic resin material such as plastic. The second front panel may include the synthetic resin material because the second front panel 130 generally does not need to support a heavy object, and a temperature is maintained at a very low level around the second accommodation space 103 in which the second front panel 130 is disposed, as compared to around the first accommodation space 101 in which the first front panel 120 is disposed. Considering this aspect, the front surface of the second accommodation space 103 may be covered by the second front panel 130 formed of a lightweight, low-cost material instead of being covered by a heavy, expensive metallic plate.

Also, when the second front panel 130 is formed of a synthetic resin material as described above, because the fitting boss 137 and the first fastening hole 138 can be integrally molded with the second front panel 130 during the molding process of the second front panel 130, the fitting boss 137 and the first fastening hole 138 can be very easily formed at a low cost. As an example, a fastening boss 139 may be provided on the second front panel 130. The fastening boss 139 may be formed in a cylindrical shape that protrudes rearward from a panel main body portion 131 of the second front panel 130.

A hollow may be formed in the fastening boss 139, and the hollow may be formed to pass through the fastening boss 139 in the front-rear direction. The hollow formed in the fastening boss 139 in this way may be the first fastening hole 138. In certain examples, since the second front panel 130 is formed of a synthetic resin material, the fastening boss 139, which is a structure protruding from the second front panel 130, and the first fastening hole 138 formed in the fastening boss 139 can be easily molded during the molding process of the second front panel 130.

Meanwhile, as illustrated in FIGS. 9 and 12, the supporter holder 570 may further include a fitting protrusion 573a. The fitting protrusion 573a may be formed to protrude forward from the holder main body 571. The fitting protrusion 573a may be inserted into a fitting groove in the fitting boss 137 and fitted and coupled to the fitting boss 137. As an example, the fitting protrusion 573a may be formed to protrude in the shape of in inverted "L" from the coupling surface 573 of the holder main body 571. For example, the fitting protrusion 573a may be formed by connection of a protrusion protruding forward from the coupling surface 573 and another protrusion extending sideward from a front end of this protrusion.

Corresponding thereto, the fitting groove may be concavely formed in the fitting boss 137 with a shape that corresponds to the shape of the fitting protrusion 573a. For example, the fitting groove may be concavely formed in the shape of an inverted "L" inside the fitting boss 137. The fitting protrusion 573a may be fitted and coupled to the fitting boss 137 by moving forward to be inserted into the fitting boss 137 and then moving sideward inside the fitting groove.

Also, as illustrated in FIGS. 9 and 13, a second fastening hole 573b may be provided in the supporter holder 570. The second fastening hole 573b may be formed to pass through the coupling surface 573 of the holder main body 571 in the front-rear direction.

The second fastening hole 573b may be disposed to be spaced apart from the fitting protrusion 573a and may be disposed to be spaced apart therefrom at a distance that corresponds to a distance between the fitting boss 137 and the fastening boss 139. The holder main body 571 and the fastening boss 139 may be coupled by a fastening member or screw (s) that passes through the second front panel 130 and the holder main body 571 through the first fastening hole 138 and the second fastening hole 573b. By coupling between the holder main body 571 and the fastening boss 139, a coupling between the second front panel 130 and the supporter holder 570 may be performed.

The fitting protrusion 573a may be fitted and coupled to the second front panel 130 by being coupled to the fitting boss 137 by being fitted and coupled thereto. Also, the fastening boss 139 may be coupled to the second front panel 130 by the fastening member s that passes through the first fastening hole 138 and the second fastening hole 573b and fixes the fastening boss 139 to the second front panel 130.

A task of coupling the supporter holder 570 to the second front panel 130 may be performed by, first, fitting the fitting protrusion 573a to the fitting boss 137 to temporarily fix the supporter holder 570 to the second front panel 130 as illustrated in FIGS. 9 and 12, and then using the fastening members to fix the fastening boss 139 to the second front panel 130 as illustrated in FIGS. 9 and 13.

According to this example, coupling by fitting can be performed at a plurality of points in the lateral direction, and coupling by fitting and coupling by fixing can be performed together at a plurality of points in the up-down direction. Since coupling by fitting and coupling by fixing can be performed together at a plurality of points, as mentioned above, coupling between the supporter holder 570 and the second front panel 130 can be stably performed. The supporter holder 570 and the second front panel 130 coupled as described above can, in addition to allowing a coupling the supporter holder 570 and the second front panel 130 to be easily and promptly performed, also allow the supporter holder 570 to be installed to be stably fixed to an accurate position relative to the second front panel 130.

[Actions and Effects of Detection Module]

Figure 14:
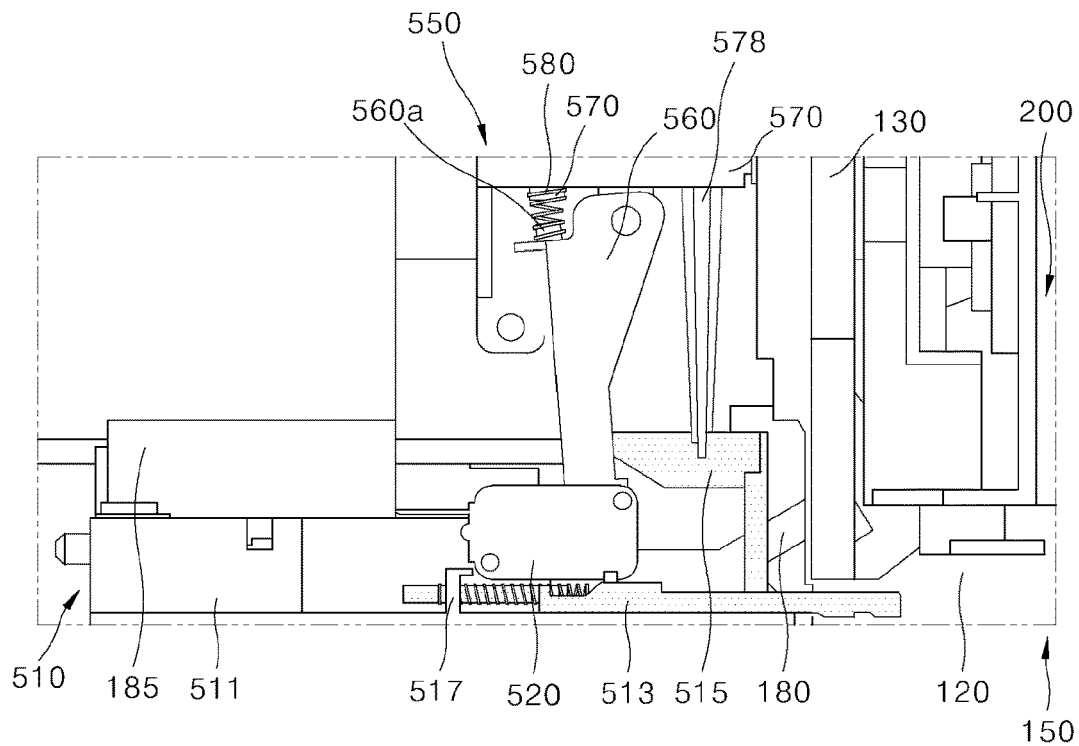
FIG. 14 is a lateral cross-sectional view showing a structure of a detection module according to one example of the present disclosure.
Figure 15:
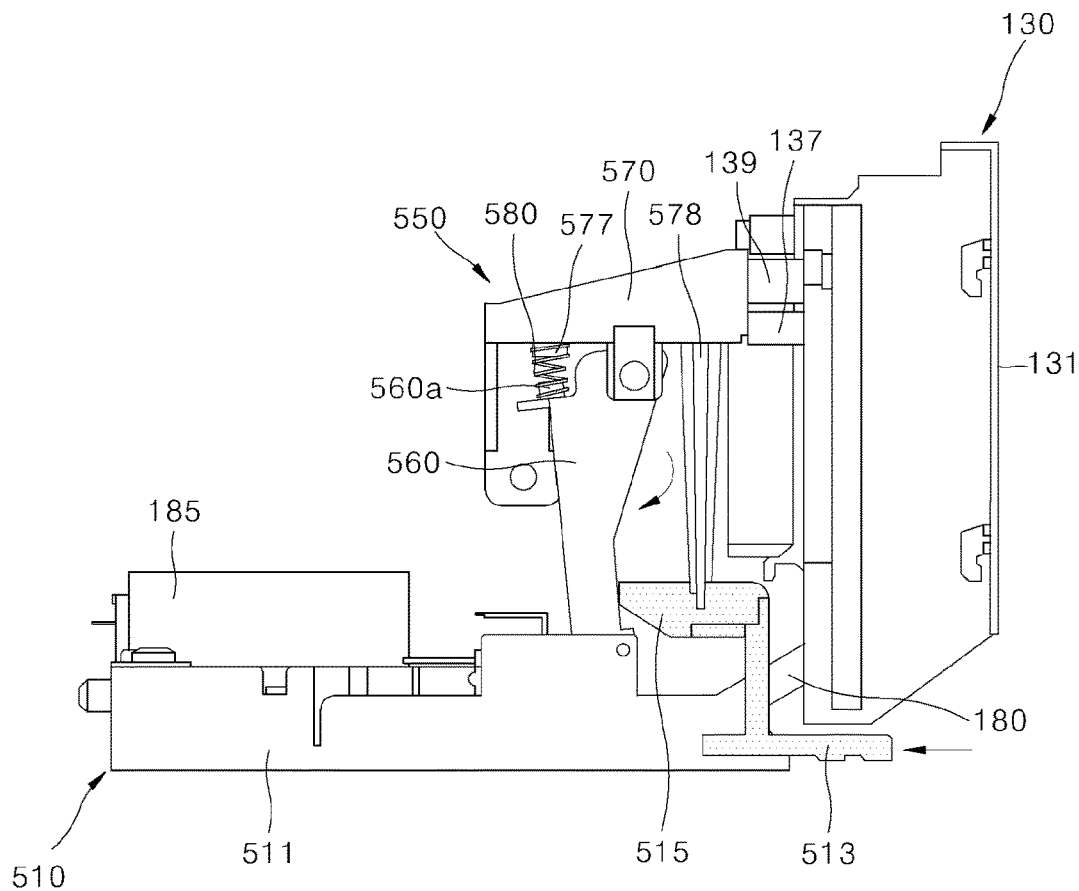
FIG. 15 is a lateral view separately illustrating the detection module illustrated in FIG. 14.
Figure 16:
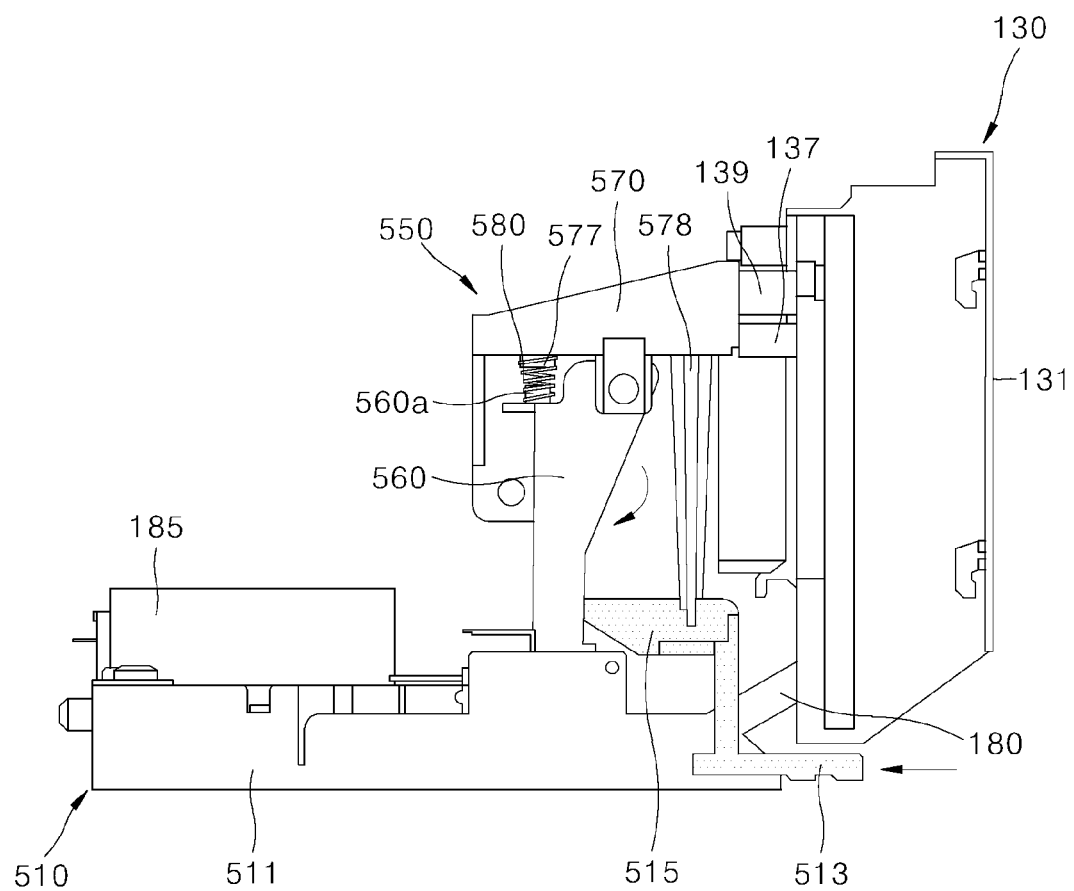
FIG. 16 is a lateral view showing a state of the detection module while a door is closed.
Figure 17:
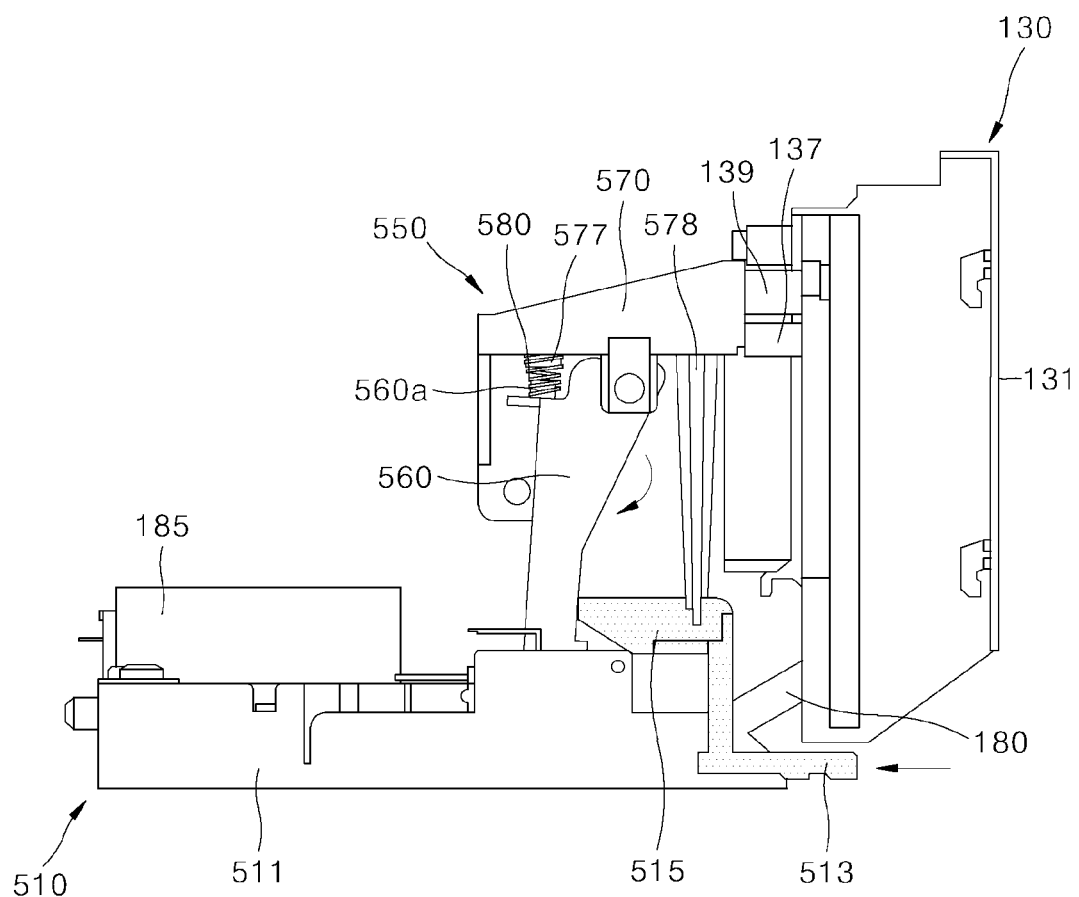
FIG. 17 is a lateral view showing a state of the detection module when a knock is made on the door.

FIG. 14 is a lateral cross-sectional view showing a structure of a detection module according to one example of the present disclosure, and FIG. 15 is a lateral view separately illustrating the detection module illustrated in FIG. 14. Also, FIG. 16 is a lateral view showing a state of the detection module while a door is closed, and FIG. 17 is a lateral view showing a state of the detection module when a knock is made on the door.

Hereinafter, actions and effects of the detection module provided in the appliance according to one example of the present disclosure will be described. Referring to FIGS. 14 and 15, the detection module 500 may include the detection main body portion (or main body) 510, the first sensor 520, the second sensor 530, and the support assembly 550.

The detection main body portion 510 may include the main supporter 511 and the transmission members 513 and 515. The main supporter 511 may be installed at the upper panel 140, and the transmission members 513 and 515 may be movably installed at the main supporter 511 in the front-rear direction. At least a portion of the transmission members 513 and 515, for example, front ends of the transmission members 513 and 515, may be disposed between the first front panel 120 and the door 150 and exposed toward the door 150. The transmission members 513 and 515 may include the first transmitter 513 and the second transmitter 515, and the first transmitter 513 may be connected to the first sensor 520.

When the door 150 is open, the first transmitter 513 may be disposed at a front side of the first sensor 520. When the door 150 is closed as illustrated in FIG. 16, the first transmitter 513 may be pushed by the door 150, move rearward, and come in contact with the actuator of the first sensor 520. When the actuator of the first sensor 520 moves due to coming in contact with the first transmitter 513 as described above, the first sensor 520 may be turned on and detect that the door 150 is closed.

The second transmitter 515 may move in accordance with movement of the first transmitter 513. The second transmitter 515 may move together with the first transmitter 513 and transmit a vibration input to the door 150 to the second sensor 530.

As illustrated in FIGS. 5 and 17, when a knock is input to the door 150, due to the door 150 moving rearward due to a vibration input to the door 150, the first transmitter 513 is pushed and further moves rearward. In accordance with the movement of the first transmitter 513, the second transmitter 515 also further moves rearward and presses the supporter 560 rearward.

Accordingly, the supporter 560 rotates rearward, and the second sensor 530 may also move rearward together with the supporter 560 rotating rearward. In this process, the second sensor 530 may detect a vibration transmitted to the supporter 560. The second sensor 530 may determine whether the vibration detected by the second sensor 530 is a vibration caused by a knock input by a user. When the corresponding vibration is determined as a vibration caused by a knock input by a user, the second sensor 530 may output information relating thereto in the form of a first signal and send the first signal to the controller 600. The controller 600 that has received the first signal from the second sensor 530 may control the operation of the lamp 190 based on the first signal.

The above-described operation may be provided by a knock-on function. As an example, the knock-on function may be turned on when a user touches the knock-on button displayed on the input portion of the control panel 200 (see FIG. 1) a first time and may be turned off when the user touches the knock-on button a second time. The knock-on function is a function that allows the lamp 190 to be turned on or off by a knock made by a user. That is, while the knock-on function is turned on, the lamp 190 may be automatically turned on or off due to a knock input by the user. Conversely, while the knock-on function is turned off, the lamp 190 is not automatically turned on or off even when a knock is input by the user. Therefore, the user may turn on the knock-on function when the user wants to use the knock-on function and may turn off the knock-on function when the user does not want to use the knock-on function.

Also, the lamp button displayed on the input portion of the control panel 200 may be for manually turning the lamp 190 on or off regardless of whether a knock is input by the user. For example, the lamp 190 may be turned on when the user touches the lamp button displayed on the input portion of the control panel 200 a first time and may be turned off when the user touches the lamp button a second time.

While the lamp 190 is turned on due to the user touching the lamp button, the lamp 190 is not turned off even when a knock is input by the user. That is, the knock-on function does may not operate when the lamp 190 is turned on by the user manually touching the lamp button. For example, when the lamp 190 is turned off in response to an input of a knock in the process in which the user checks the inside of the appliance by manually turning on the lamp 190, the user may not be able to perform an intended task by manually turning on the lamp 190. However, when the lamp 190 is turned off by the user touching the lamp button, the knock-on function may work, and the lamp 190 may be turned on or off by a knock input by the user.

As another example, the self-cleaning button may also be displayed on the input portion of the control panel 200. Self-cleaning may include functions such as automatic disinfection, automatic cleaning, and the like of the first accommodation space 101 by the appliance itself. The operation of the appliance may be set so that the knock-on function does not work during the self-cleaning process. In this case, even when a knock is input by a user, the lamp 190 may not turned on or off. For example, the first accommodation space 101 may be maintained at a very high temperature while self-cleaning is performed. When the lamp 190 is turned on in this state, there is a concern that the lamp 190 may be damaged due to high-temperature heat. Considering this aspect, in certain implementations of the present disclosure, the operation of the appliance may be set so that the knock-on function does not work during the self-cleaning process.

Meanwhile, the detection module 500 may provide a function of detecting opening of the door 150. When the door 150 is open, the supporter 560 and the transmission members 513 and 515 do not come in contact, and accordingly, the second sensor 530 may reach a state in which the second sensor 530 cannot normally detect a knock. For example, when the door 150 is open, even when a user knocks on the door 150, a vibration caused by the knock may not be transmitted to the supporter 560 through the transmission members 513 and 515, and thus the second sensor 530 is not able to detect the knock. Considering this aspect, when a vibration is detected by the second sensor 530, the door 150 may generally be assumed to be closed. For example, closing of the door 150 may be detected by a vibration detected by the second sensor 530. In this way, using the detection module 500 including the second sensor 530 configured to detect a vibration, the appliance of the present application may also provide a function of detecting whether the door 150 is closed in a mechanical way without adding a separate module.

In certain examples, the appliance may be an oven that has a cooking chamber of a smaller capacity compared to typical steam ovens or has a cooking chamber of the same capacity but a smaller size overall compared to typical steam ovens (hereinafter referred to as "small and medium-sized steam oven"). In the case of the small and medium-sized steam oven, a distance between a cooking chamber (corresponds to the first accommodation space of the present example) and the control panel may be inevitably shortened compared to typical steam ovens. In the small and medium-sized steam oven, instead of a front panel, the control panel 200 may serve as a cover that covers an electric component space (corresponding to the second accommodation space 103) from a front side.

In the appliance provided in the form of the above-described small and medium-sized steam oven, it is difficult to secure a space for arranging a water supply device 300 between the cooking chamber and the control panel. In order to arrange the water supply device 300 between the cooking chamber and the control panel, a distance between an upper surface of the cavity and the control panel in the up-down direction should be secured to be sufficient for arranging the water supply device 300, but this is not easy in the small and medium-sized steam oven.

The control panel 200 of the present example provided to be applied to the above appliance may serve as a cover that covers the water supply device 300, particularly, a water tank 320, from a front side as illustrated in FIG. 4. The control panel 200 may be provided to cover the entire second accommodation space 103, in which the water supply device 300 is disposed, from a front side.

The front surface of the second accommodation space 103 may be covered by the control panel 200, but when the control panel 200 moves to the opening position, the inside of the second accommodation space 103 is opened toward the front. In order to prevent this occurrence, the second front panel 130 may be provided at the front surface of the second accommodation space 103. The second front panel 130 may serve as a cover that is disposed at a front side of the second accommodation space 103 to cover the second accommodation space 103 from the front side.

Generally, the first front panel 120 may be formed of a metal material to withstand high-temperature heat while securing structural rigidity. On the other hand, the second front panel 130 may be formed of a synthetic resin material such as plastic. This is because the second front panel 130 typically does not need to support a heavy object, and temperature may be generally maintained at a relatively low level around the second accommodation space 103 in which the second front panel 130 is disposed, as compared to around the first accommodation space 101 in which the first front panel 120 is disposed. Considering this aspect, the front surface of the second accommodation space 103 may be covered by the second front panel 130 formed of a lightweight, low-cost material instead of being covered by a heavy, expensive metallic plate.

The second front panel 130 being formed of a lightweight, low-cost material as mentioned above can provide effects of lowering the weight and manufacturing costs of the appliance. Also, because the second front panel 130 may be formed of a synthetic resin material such as plastic, an effect of facilitating the addition of structures such as the fitting boss 137 (see FIG. 12) and the fastening boss 139 (see FIG. 13) to the front panels 120 and 130 can be provided.

Also, the second front panel 130 being formed of a synthetic resin material, as described above, may have a relatively significantly lower thermal conductivity than the first front panel 120 formed of a metal material. Therefore, the detection module 500 coupled to the second front panel 130 or installed adjacent to the second front panel 130 may be much less affected by heat, compared to when the detection module 500 is installed at a member made of a metal material.

The detection module 500 of the present example may be disposed at a front portion of the main body 100 that is relatively adjacent to the door 150. When the detection module 500 is disposed at the front portion of the main body 100 in this way, a distance between the door 150 and the sensors 520 and 530 may be relatively close, and because the distance between the door 150 and the sensors 520 and 530 is close, the door opening/closing detection performance and knock detection performance can be improved.

In particular, in the case of the second sensor 530, an increase in the distance between the door 150 and the second sensor 530 may make it difficult for a vibration input to the door 150 to be properly transmitted to the second sensor 530. For example, for an acoustic wave caused by a knock to reach the second sensor 530, a portion between a point where the knock is made and a point where the second sensor 530 is installed should be formed of a single medium, but it is not easy to satisfy this condition. Considering this aspect, in certain examples, the detection module 500 may be disposed at the front portion of the main body 100 that is relatively adjacent to the door 150, thus providing further improved door opening/closing detection performance and knock detection performance.

In the case of an appliance such as an oven, due to the characteristic of the oven that the inside of a cooking chamber closed by the door 150 is heated, high-temperature heat is inevitably transferred to the door 150 and portions around the door 150. Therefore, the front portion of the main body 100 that is relatively adjacent to the door 150 may be prone to be affected by the high-temperature heat. However, in a rear-side area of the second front panel 130, an influence of heat transferred from around the door 150 can be considerably blocked by the second front panel 130. Because the second front panel 130 may have low thermal conductivity, the second front panel 130 does not easily transfer heat to the rear-side area of the second front panel 130 and also serves as a barrier that blocks movement of heat to the detection module 500 and other items in the second accommodation space 103. Accordingly, although the detection module 500 may be disposed at the front portion of the main body 100 that is adjacent to an area to which high-temperature heat is transferred, a risk that the sensors 520 and 530 installed in the detection module 500 may malfunction or be damaged due to an influence of heat can be significantly reduced.

Further, the fan module 170 may be disposed inside the second accommodation space 103, and the fan module 170 may suction outside air and introduces the outside air into the duct portion 143. Air introduced into the duct portion 143 may be discharged to the front of the second accommodation space 103 through the exhaust port 122 after moving forward inside the duct portion 143. As compared to other areas of the second accommodation space 103, areas around the duct portion 143 and the exhaust port 122 that are cooled by outside air as described above may be maintained in a lower temperature state.

In certain examples, the duct portion 143 may be provided so that the width of the duct portion 143, that is, the length of the duct portion 143 in the lateral direction, gradually increases toward a front side. For example, the width of the duct portion 143 may gradually increase toward the front side. Accordingly, in the front portion of the main body 100 where the front panels 120 and 130 are disposed, the duct portion 143 may be disposed in most of the areas at the front side of the main body 100.

According to certain examples, the detection module 500 may be disposed at the front portion of the main body 100 and may be disposed at a position adjacent to the duct portion 143 and the exhaust port 122. By the detection module 500 being disposed at a position adjacent to the duct portion 143 and the exhaust port 122 where the temperature is lower than in other areas, a risk that the sensors 520 and 530 installed in the detection module 500 may malfunction or be damaged due to an influence of heat can be significantly reduced.

In the appliance according to certain examples described above, the detection module 500 may be disposed at the front portion of the main body 100, and the front portion of the main body 100 where the detection module 500 is disposed may maintain a low temperature state due to the second front panel 130, the duct portion 143, and the like. In this way, knock detection performance can be improved, and a risk of malfunction of and damage to the sensors 520 and 530 can be significantly reduced.

Additionally, in the detection module 500 of the present example, the latch 180 and the driving portion 185 may also provided in addition to the first sensor 520 and the transmission members 513 and 515. For example, the detection module 500 in certain examples may simultaneously include the first sensor 520, the transmission members 513 and 515, the latch 180, and the driving portion 185.

In an appliance in certain examples, various electric components are accommodated in the second accommodation space 103. Among the electric components, the water tank 320, the opening module 400, and the detection module 500 are those that may be disposed adjacent to the front side of the main body 100. This configuration may be achieved because the water tank 320 may be disposed at a position at which it is easy for the water tank 320 to be withdrawn forward, and the opening module 400 may be disposed at a position adjacent to the control panel 200. Also, the detection module 500 may be disposed at a position relatively close to the door 150 to ensure higher detection performance.

Accordingly, the front surface of the main body 100 corresponding to most of the area coming in contact with the second front panel 130 may be occupied by the water tank 320, the opening module 400, and the detection module 500. However, the latch 180 also may be disposed adjacent to the front side of the main body 100, like the water tank 320, the opening module 400, and the detection module 500. This positioning is because the latch 180 can effectively lock the door 150 only when the latch 180 is disposed at a position adjacent to the door 150. The driving portion 185 also may be disposed at a position not far from the latch 180 in order to be disposed at a position where the driving portion 185 can be easily connected to the latch 180 to drive the latch 180.

However, because most of the area coming in contact with the second front panel 130 is occupied by the water tank 320, the opening module 400, and the detection module 500 as mentioned above, there may be difficulty in securing a position for installing the latch 180. In particular, in the small and medium-sized steam oven having a smaller size than typical steam ovens, there may be greater difficulty in securing a space necessary for installing all of the water tank 320, the opening module 400, the detection module 500, and the latch 180.

Considering this aspect, in certain example, the detection module 500 may be provided to simultaneously include the first sensor 520, the transmission members 513 and 515, the latch 180, and the driving portion 185. For example, the first sensor 520, the transmission members 513 and 515, the latch 180, and the driving portion 185 may be provided in the form of a single module.

When the first sensor 520, the transmission members 513 and 515, the latch 180, and the driving portion 185 are provided in the form of a single module as mentioned above, the first sensor 520, the transmission members 513 and 515, the latch 180, and the driving portion 185 can be installed by occupying less space compared to when the first sensor 520, the transmission members 513 and 515, the latch 180, and the driving portion 185 being separately installed. Also, when the first sensor 520, the transmission members 513 and 515, the latch 180, and the driving portion 185 are provided in the form of a single module as mentioned above, the installation of the first sensor 520, the transmission members 513 and 515, the latch 180, and the driving portion 185 can be completed by simply installing the detection module 500 including all of the first sensor 520, the transmission members 513 and 515, the latch 180, and the driving portion 185, without the need to separately install each of the first sensor 520, the transmission members 513 and 515, the latch 180, and the driving portion 185.

By the appliance in the present disclosure including the detection module 500, not only is it possible to efficiently secure a space necessary for installing the latch 180, but also the components disposed in the second accommodation space 103 can be managed more easily and conveniently, and a task of installing the components can be performed more easily and promptly.

The present disclosure is directed to providing an appliance with an improved structure to allow a sensor to be installed at a position where high knock detection performance can be provided. The present disclosure is also directed to providing an appliance with an improved structure to allow a knock input to be effectively detected even in an appliance in which it is difficult to attach a sensor on a door due to high-temperature heat, such as an oven.

An appliance, which is one example of the present disclosure, includes a detection main body portion configured to receive a force generated due to movement of a door as an input, a first sensor configured to detect opening or closing of the door, and a second sensor configured to detect a vibration input to the door, wherein both the first sensor and the second sensor detect the force input to the detection main body portion. Accordingly, a detection module may be disposed at a front portion of a main body that is adjacent to the door, and a distance between the door and sensors may be close.

Also, in certain examples of the present disclosure, a detection module may be disposed in an area blocked by a second front panel having low thermal conductivity, and the detection module and the second front panel may be disposed at a front side of a main body that is adjacent to a door. Also, in certain examples of the present disclosure, an appliance includes: a cavity having a first accommodation space with an open front surface formed therein; a door disposed at a front side of the first accommodation space and configured to rotate about a lower end of the door in a front-rear direction to open or close the first accommodation space; a detection module disposed in a second accommodation space, which is disposed at an upper side of the first accommodation space, and configured to detect movement of the door; a first front panel disposed between the cavity and the door; and a second front panel disposed to block a front of the second accommodation space and coupled to the front panel. The second front panel may be formed of a synthetic resin material and disposed to block between the door and the detection module.

Accordingly, the detection module may be disposed at a rear-side area of the second front panel formed of a material having low thermal conductivity, and the second front panel may serve as a barrier that blocks movement of heat toward the detection module. In this way, the present disclosure can suppress the detection module from being affected by heat transferred from around the door.

Also, in certain examples of the present disclosure, a detection main body portion configured to receive a force generated due to movement of a door as an input, a first sensor configured to detect opening and closing of the door, and a latch configured to be caught in and lock the door may be included together in a single detection module.

One aspect of the present disclosure provides an appliance including: a main body having a first accommodation space with an open front surface formed therein; a door disposed at a front side of the first accommodation space and configured to rotate about a lower end of the door in a front-rear direction to open or close the first accommodation space; and a detection module disposed in a second accommodation space, which is disposed at an upper side of the first accommodation space, and configured to detect movement of the door.

Also, the detection module may include: a detection main body portion installed at the main body and connected to the door at the front side of the first accommodation space to receive a force generated due to movement of the door as an input; a first sensor configured to detect the force input to the detection main body portion to detect opening and closing of the door; and a second sensor configured to detect the force input to the detection main body portion to detect a vibration input to the door. Also, the detection main body portion may include: a main supporter installed at the main body; and transmission members movably installed on the main supporter in the front-rear direction and configured to receive the force generated due to movement of the door as an input and move in the front-rear direction.

Also, the transmission members may move to a rear side due to the movement of the door. Also, the detection module may further include an elastic member configured to provide an elastic force that allows the transmission members to return to a front. Also, the transmission members may include: a first transmitter configured to receive the force generated due to movement of the door as an input and transmit the force to the first sensor; and a second transmitter configured to receive the force generated due to movement of the door as an input and transmit the force to the second sensor. Also, the first transmitter may be movably installed on the main supporter in the front-rear direction and may be provided to come in contact with the door at the front side of the first accommodation space.

Also, the second transmitter may move in accordance with the movement of the first transmitter. Also, the first transmitter and the second transmitter may be integrally formed and move as a whole. Also, the first transmitter may be formed in the shape of a bar that extends in the front-rear direction. Also, the second sensor may be disposed at an upper side of the first sensor. Also, the second transmitter may be formed to protrude upward from the first transmitter. Also, the first transmitter and the second transmitter may be connected to form a sideways U-shape together.

Also, the detection module may further include a support assembly configured to support the second sensor and transmit a vibration transmitted through the detection main body portion to the second sensor. Also, the support assembly may include: a supporter configured to support the second sensor and undergo a change in posture due to a vibration transmitted by the transmission members; and a supporter holder installed at the main body and configured to support the supporter so that the posture of the supporter is able to be changed. Also, the position of the sensor in the front-rear direction may be changed in accordance with a change in the posture of the supporter.

Also, the detection main body portion may include a first transmitter installed to be movable to a rear in accordance with movement of the door and a second transmitter configured to move in accordance with movement of the first transmitter. Also, the supporter may be disposed at a side above the first sensor. Also, the second transmitter may protrude upward from the first transmitter and may be formed to protrude to a height at which the second transmitter is able to come in contact with the supporter.

Also, the supporter holder may further include a front wall body disposed at a front side of the supporter. Also, the front wall body may protrude downward from a holder main body. Also, an upper end of the second transmitter may be higher than a lower end of the front wall body, and a through-hole forming a passage that allows the second transmitter to pass through the front wall body in the front-rear direction may be provided in the front wall body.

The appliance of the present disclosure may include: a cavity having the first accommodation space formed therein; and front panels disposed between the cavity and the door and having at least a portion disposed at a front of the second accommodation space. Also, the supporter holder may be installed at the front panels. Also, the supporter may include: a sensor support portion configured to support the sensor; and a rotation support portion configured to rotatably couple the sensor support portion to the supporter holder in the front-rear direction.

Also, the supporter holder may include: the holder main body coupled to the front panels and disposed at an upper side of the supporter; and rotation protrusion supports each configured to protrude downward from the holder main body and rotatably support the supporter. Also, the front panels may include a fitting boss configured to protrude rearward from the front panels. Also, the supporter holder may further include a fitting protrusion configured to protrude forward from the holder main body. Also, the fitting protrusion may be inserted into a fitting groove formed in the fitting boss and be fitted and coupled to the fitting boss.

Also, the front panels may include a first front panel disposed between the cavity and the door and a second front panel disposed to block a front of the second accommodation space and coupled to the first front panel. Also, the first front panel may be formed of a metal material, and the fitting boss may be formed on the second front panel formed of a synthetic resin material.

Also, a first fastening hole disposed to be spaced apart from the fitting boss in a lateral direction may be formed to pass through the front panels in the front-rear direction. Also, a second fastening hole communicating with the first fastening hole may be formed to pass through the holder main body in the front-rear direction. Also, a fastening member may pass through the front panels and the holder main body through the first fastening hole and the second fastening hole and couple the front panels and the supporter holder.

Also, the second front panel may be formed of a material having lower thermal conductivity than the first front panel and may be disposed to block between the door and the detection module. Also, the second front panel may be formed of a synthetic resin material and disposed to block between the door and the detection module.

Also, the appliance of the present disclosure may further include a latch configured to be caught in and lock the door and a driving portion configured to operate the latch. Also, the latch, the driving portion, and the first sensor may be installed together on the detection main body portion.

According to an appliance of the present disclosure, since a detection module is disposed at a front portion of a main body that is adjacent to a door, it is possible to provide door opening/closing detection performance and knock detection performance that are improved corresponding to a decrease in a distance between the door and sensors. Also, according to the present disclosure, since a detection module is disposed at a rear-side area of a second front panel formed of a material having low thermal conductivity, and the second front panel serves as a barrier that blocks movement of heat, it is possible to suppress the detection module from being affected by heat transferred from around the door.

Also, according to the present disclosure, since a detection module is disposed in an area that maintains a lower temperature state than other areas of a second accommodation space, such as an area around a duct portion, an exhaust port, and the like cooled by outside air, it is possible to maintain the temperature of the detection module to be low.

According to the present disclosure, a knock input can be effectively detected even in an appliance in which it is difficult to attach a sensor on a door due to high-temperature heat, such as an oven, an influence of heat on the sensor can be reduced, and accuracy in detection by the sensor can be improved. Also, according to the present disclosure, since a sensor is disposed at a position free from an influence of heat, a risk that the sensor may malfunction or be damaged due to the influence of heat can be significantly lowered. In this way, according to the present disclosure, an influence of heat on the sensor can be reduced, and accuracy in detection by the sensor can be improved.

The present disclosure has been described above with reference to the examples illustrated in the accompanying drawings, but the above description is merely illustrative, and those of ordinary skill in the art should understand that various modifications and other equivalent examples are possible from the above description. Therefore, the true technical scope of the present disclosure should be defined by the claims below.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular examples only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized examples (and intermediate structures) of the disclosure. As such, variations from the shapes of the illustrations as a result, for example, of manufacturing techniques and/or tolerances, are to be expected. Thus, examples of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one example," "an example," "example example," etc., means that a particular feature, structure, or characteristic described in connection with the example is included in at least one example of the invention. The appearances of such phrases in various places in the specification are not necessarily all referring to the same example. Further, when a particular feature, structure, or characteristic is described in connection with any example, it is submitted that it is within the purview of one skilled in the art to effect such feature, structure, or characteristic in connection with other ones of the examples.

Although examples have been described with reference to a number of illustrative examples thereof, it should be understood that numerous other modifications and examples can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An appliance comprising:
   a main body having a first accommodation space with an open front and a second accommodation space formed therein, the second accommodation space being provided above the first accommodation space;
   a door provided at a front side of the first accommodation space and configured to rotate about a lower end of the door in a front-rear direction to open or close the first accommodation space; and
   a detection module provided in the second accommodation space and configured to detect movement of the door,
   wherein the detection module includes:
      a detection module main body installed at the main body and at the front side of the first accommodation space to receive a force input from the door,
      a first sensor configured to detect the force input to the detection module main body to detect opening and closing of the door, and
      a second sensor configured to detect the force input to the detection module main body to detect a vibration associated with an input to the door.

2. The appliance of claim 1, wherein the detection module main body includes:
   a main supporter installed at the main body; and
   one or more transmission members movably installed on the main supporter and configured to receive the input force of the door and to move in a front-rear direction.

3. The appliance of claim 2, wherein:
   the one or more transmission members move to a rear side due to the force input of the door; and
   the detection module further includes an elastic member configured to provide an elastic force that causes the one or more transmission members to return in a front direction.

4. The appliance of claim 2, wherein the one or more transmission members include:
   a first transmitter configured to receive the input force of the door and transmit the input force to the first sensor; and
   a second transmitter configured to receive the input force of the door and transmit the input force to the second sensor.

5. The appliance of claim 4, wherein:
   the first transmitter is installed on the main supporter to be movable in the front-rear direction and is provided to come in contact with the door at the front side of the first accommodation space; and
   the second transmitter moves in accordance with the movement of the first transmitter.

6. The appliance of claim 5, wherein:
   the first transmitter is formed in the shape of a bar that extends in the front-rear direction;
   the second sensor is provided at an upper side of the first sensor; and
   the second transmitter is formed to protrude upward from the first transmitter.

7. The appliance of claim 6, wherein the first transmitter and the second transmitter are connected together to form a sideway U-shape ("⊐").

8. The appliance of claim 4, wherein the detection module further includes a support assembly configured to support the second sensor and to transmit a vibration transmitted through the detection module main body to the second sensor.

9. The appliance of claim 8, wherein the support assembly includes:
   a supporter configured to support the second sensor and to change posture angle due to a vibration transmitted by the one or more transmission members; and
   a supporter holder installed at the main body and configured to support the supporter so that the posture angle of the supporter changes based on the vibration transmitted by the one or more transmission members,
   wherein a position of the second sensor in the front-rear direction is changed in accordance with the change in the posture angle of the supporter.

10. The appliance of claim 9, wherein:
    the first transmitter is configured to be movable toward a rear of the second accommodation space in accordance with movement of the door, and the second transmitter is configured to move in accordance with movement of the first transmitter;
    the supporter is provided at a side of and above the first sensor; and
    the second transmitter protrudes upward from the first transmitter and is formed to protrude to a height at which the second transmitter comes in contact with the supporter.

11. The appliance of claim 9, wherein:
    the supporter holder further includes a front wall body provided at a front side of the supporter; and
    the front wall body protrudes downward from the supporter holder.

12. The appliance of claim 11, wherein:
    an upper end of the second transmitter is higher than a lower end of the front wall body; and
    a through-hole forming a passage through which the second transmitter in the front-rear direction is provided in the front wall body.

13. The appliance of claim 9, further comprising:
    a cavity having the first accommodation space formed therein; and
    front panels provided between the cavity and the door, at least a portion of the front panels being provided at a front of the second accommodation space,
    wherein the supporter holder is installed at at least one of the front panels.

14. The appliance of claim 13, wherein the supporter includes:

a sensor support configured to support the sensor; and a rotation support configured to rotatably couple the sensor support to the supporter holder in the front-rear direction.

15. The appliance of claim 13, wherein the supporter holder includes:

a holder main body coupled to at least one of the front panels and provided above the supporter; and rotation protrusion supports that protrude downward from the holder main body and are configured to rotatably support the supporter.

16. The appliance of claim 15, wherein:

at least one of the front panels includes a fitting boss that protrudes rearward from the at least one of front panels;

the supporter holder further includes a fitting protrusion configured to protrude forward from the holder main body; and the fitting protrusion is inserted into a fitting groove formed in the fitting boss and is fitted and coupled to the fitting boss.

17. The appliance of claim 16, wherein:

the front panels include a first front panel provided between the cavity and the door and a second front panel provided to cover a front of the second accommodation space and coupled to the first front panel;

the first front panel is formed of a metal material;

the fitting boss is formed on the second front panel; and the second front panel is formed of a synthetic resin material.

18. The appliance of claim 17, wherein:

a first fastening hole is provided to be spaced apart from the fitting boss in a lateral direction and is formed to pass through at least one of the front panels in the front-rear direction;

a second fastening hole communicating with the first fastening hole is formed to pass through the holder main body in the front-rear direction; and a fastening member passes through the front panels and the holder main body through the first fastening hole and the second fastening hole and couples the front panels and the supporter holder.

19. The appliance of claim 1, further comprising:

a first front panel provided between the first accommodation space and the door; and a second front panel provided to cover a front of the second accommodation space and coupled to the first front panel, wherein the second front panel is formed of a material having lower thermal conductivity than the first front panel and is provided between the door and the detection module.

20. The appliance of claim 1, further comprising a latch configured to lock the door and a driving portion configured to operate the latch, wherein the latch, the driving portion, and the first sensor are installed together on the detection module main body.

* * * * *